INVENTORS
ALVIN M. MARKS
MORTIMER M. MARKS
BY Albert F. Krouman
ATTORNEY

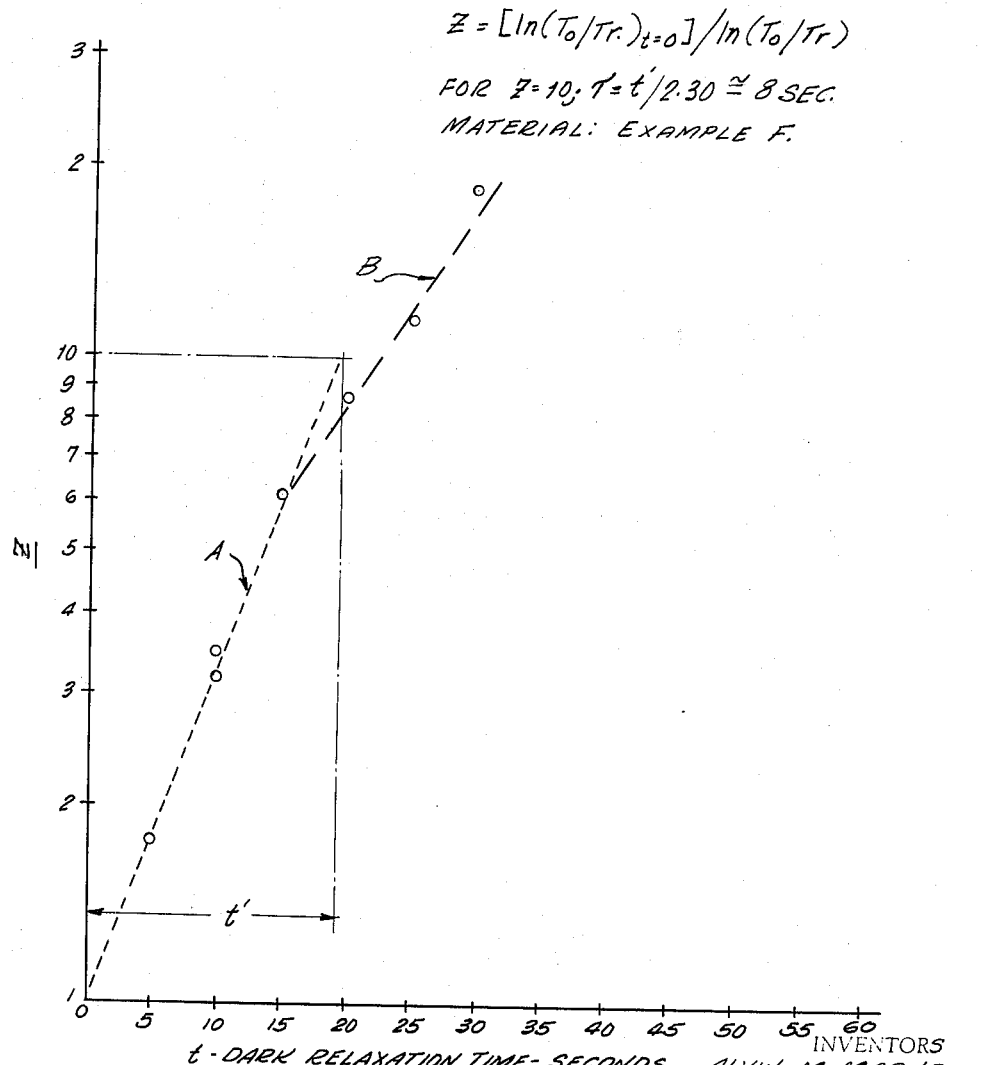

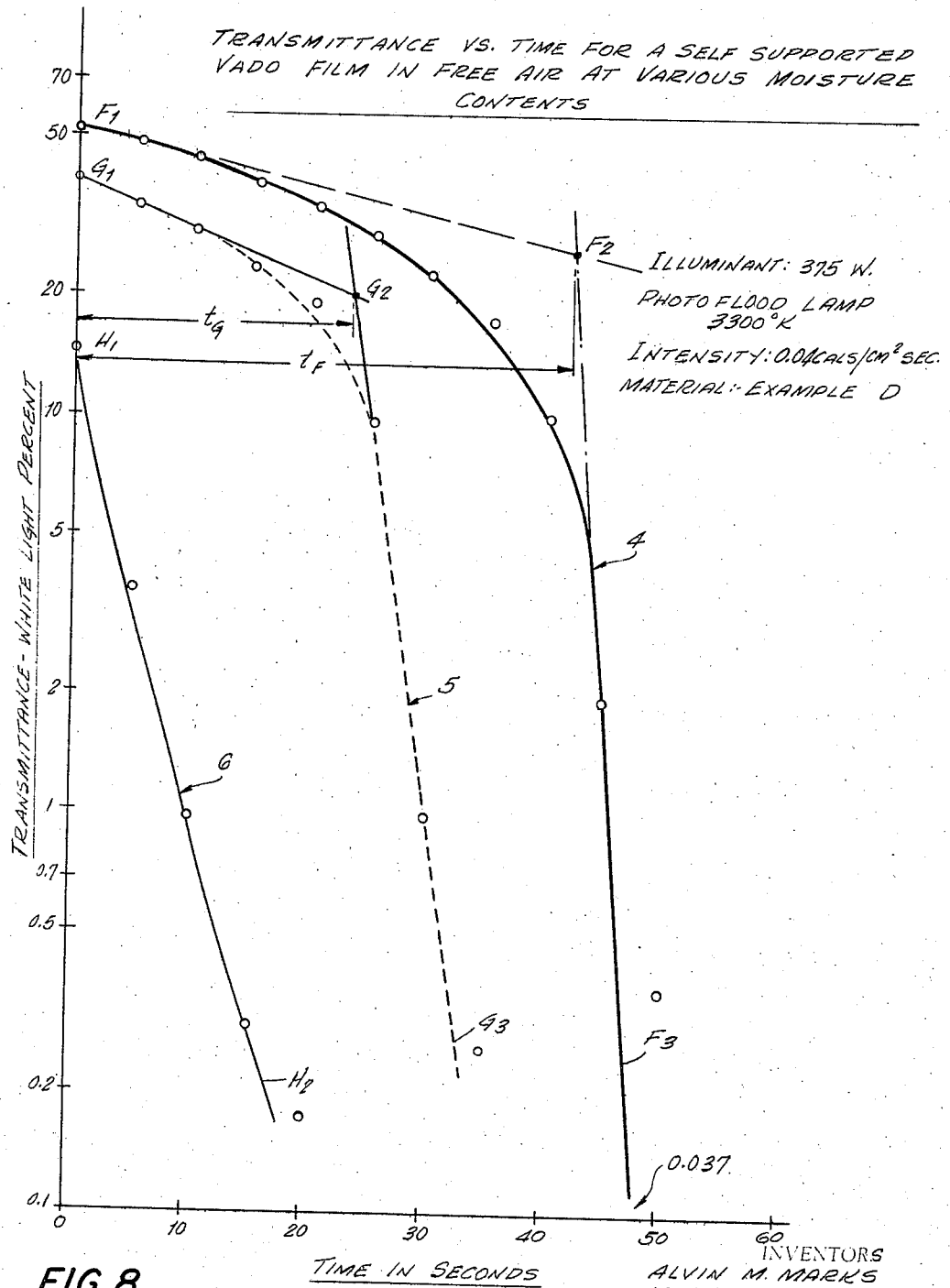

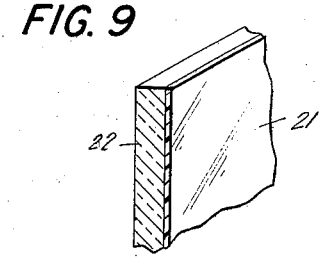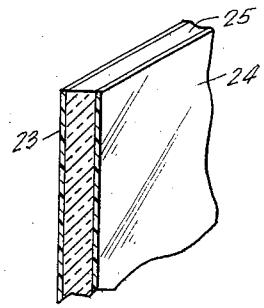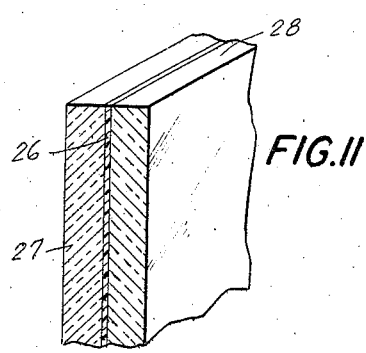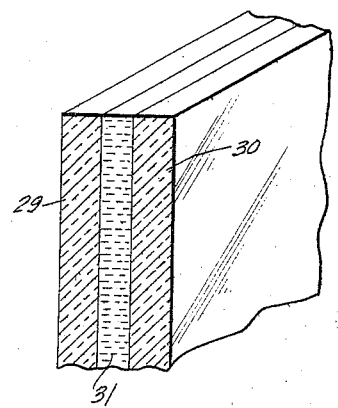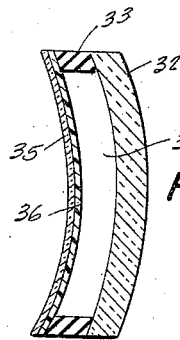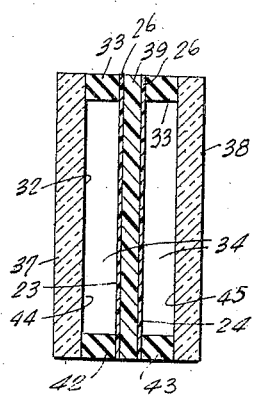

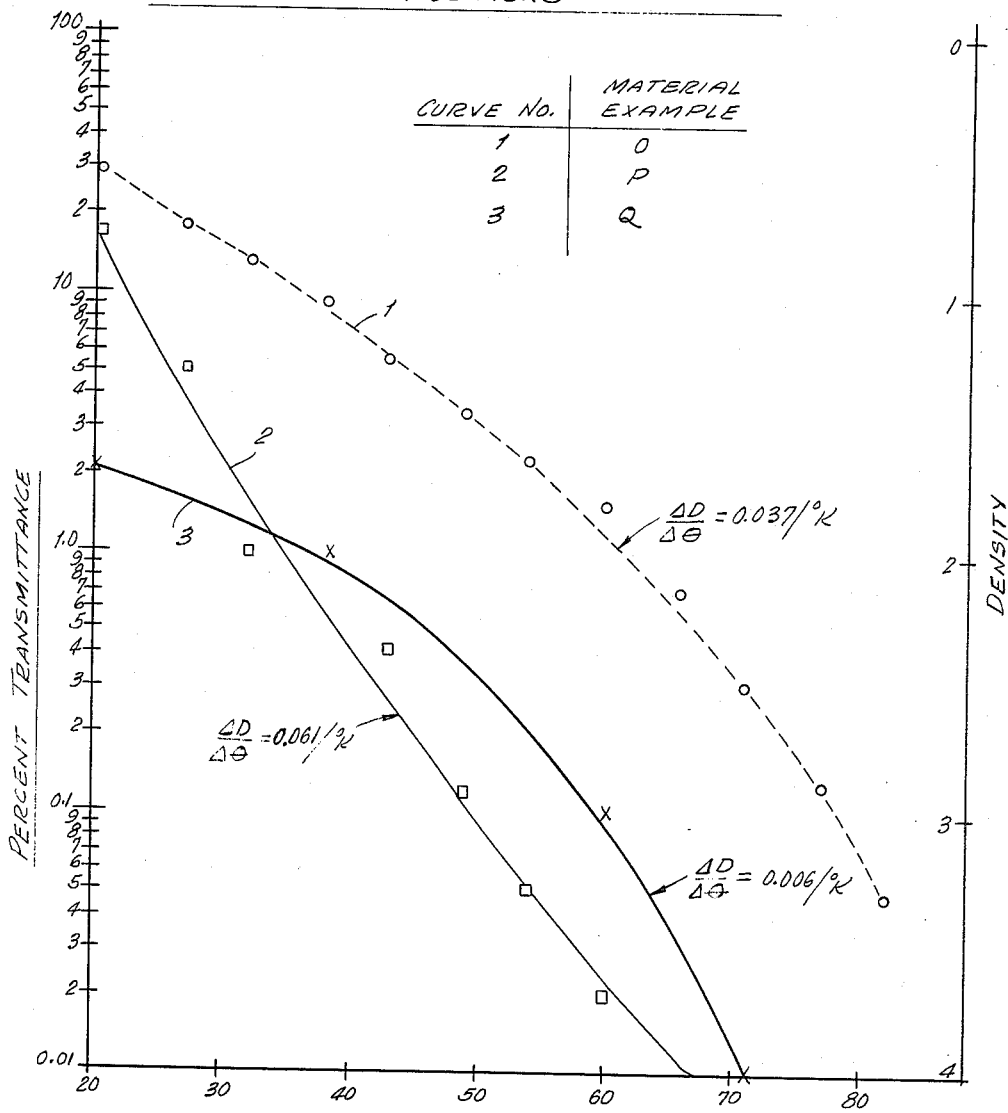

3,236,651
PHOTOTHERMOTROPIC COMPOSITIONS CONTAINING LIGANDS AND PROCESSES FOR UTILIZING SAME
Alvin M. Marks and Mortimer M. Marks, both of 153—16 10th Ave., Whitestone, N.Y.
Filed Feb. 24, 1964, Ser. No. 346,952
17 Claims. (Cl. 96—88)

This application is a continuation-in-part of copending application Serial No. 63,824 filed Oct. 20, 1960, in the names of Alvin M. Marks and Mortimer M. Marks.

This invention relates to compositions and materials which vary in light transmittance in response to changes in incident light or heat. In certain cases the reflectance also varies. These materials, hereinafter referred to as photothermotropic, are useful for the protection of the eyes from intense flashes of light or heat, and as variable density goggles, visors and windows whose transmittance decreases with an increase in light intensity from the sun or other source, and vice versa, in reversible image forming devices for photography, light amplifiers, and many other applications.

Where it is desired to protect human eyes from sudden blinding flashes of light or the effects of prolonged exposure to intense light or heat, it has been necessary heretofore to employ light absorbing goggles. However, dark colored glasses absorb light during all periods of use and thus interfere with vision under normal circumstance. Where the sudden flash may be of great intensity and total energy, the employment of presently known constant transmittance materials for eye protection is impractical, since such materials must be so highly absorbent that they cannot be used under normal light conditions. Rather, such a constant transmittance goggle must be employed at the appropriate instant. Where the flash is unexpected, constant transmittance devices are useless.

Accordingly, it is an object of the present invention to provide photothermotropic compositions which, when subjected to an increase in the intensity of incident ultraviolet, visible, or infrared light, or to a thermally or electrically induced increase in temperature, respond quickly with a decrease in transmittance, and which reversibly return to initial transmittance when the intensity is decreased.

Another object of the present invention is to provide photothermotropic compositions which will change from high transparency to substantial opacity upon excitation by incident light or heat energy.

Still another object of the instant invention is to provide photothermotropic compositions which are reversible in operation; that is, darken when energy is absorbed in the form of light or heat, and thereafter return to initial transparency when the energy is removed.

Yet another object of the instant invention is to provide photothermotropic compositions which are stable; which can be fabricated in the form of layers, as supported or unsupported films, and the like.

A feature of the present invention is its use of thin, unsupported, supported, or laminated photothermotropic films which respond to incident radiant energy by a decrease in transmittance, and which reversibly return to initial transmittance in the dark.

Another feature of this invention is the combination of a supported or unsupported photothermotropic film within an atmosphere in a sealed chamber to facilitate rapid reversal in the dark.

A further object of this invention is the fabrication of lenses, visors and windows incorporating one or more layers of a photothermotropic material.

A further feature of the present invention is the provision of sensitizers within photothermotropic compositions to increase the sensitivity of the film.

A feature of this invention is the provision of photothermotropic compositions including a transition metal halide dispersed in a polymeric matrix.

Another feature of this invention is the provision of photothermotropic compositions including a transition metal halide and a fluid.

Another feature of this invention is the provision of photothermotropic compositions including a transition metal halide with a complexing material comprising a high boiling liquid and a polymeric matrix forming a film in the nature of a gel.

Among the other features of the invention are processes for preparing photothermotropic compositions in the form of films, coatings and the like.

The invention consists of the construction, combination and arrangement of parts, as herein illustrated, described and claimed.

The invention will now be illustrated with reference to the accompanying drawings, in which:

FIGURE 5 is a graph showing the application of the relaxation formula relating to photothermotropic films made in accordance with the present invention.

FIGURE 8 is a graph showing the effect of atmospheric water content on a self-supported photothermotropic film in free air.

FIGURE 9 is a fragmentary, somewhat isometric view of a photothermotropic film upon a transparent support.

FIGURE 10 is a fragmentary, somewhat isometric view of a thin transparent support having a photothermotropic layer on each major surface thereof.

FIGURE 11 is a fragmentary, somewhat isometric view of a photothermotropic film laminated between two transparent supports.

FIGURE 12 is a fragmentary, somewhat isometric view of a photothermotropic fluid in a cell made in accordance with the present invention.

FIGURE 13 is a view in cross-section of a structure similar to FIGURE 9 on a reduced scale incorporated in a curved photothermotropic device made in accordance with the present invention.

FIGURE 14 is a cross-sectional view of a structure similar to FIGURE 10 on a reduced scale of still another photothermotropic device according to the present invention.

FIGURE 17 shows the change in transmittance with changes in temperature of fluid compositions of the present invention.

Figure 2:
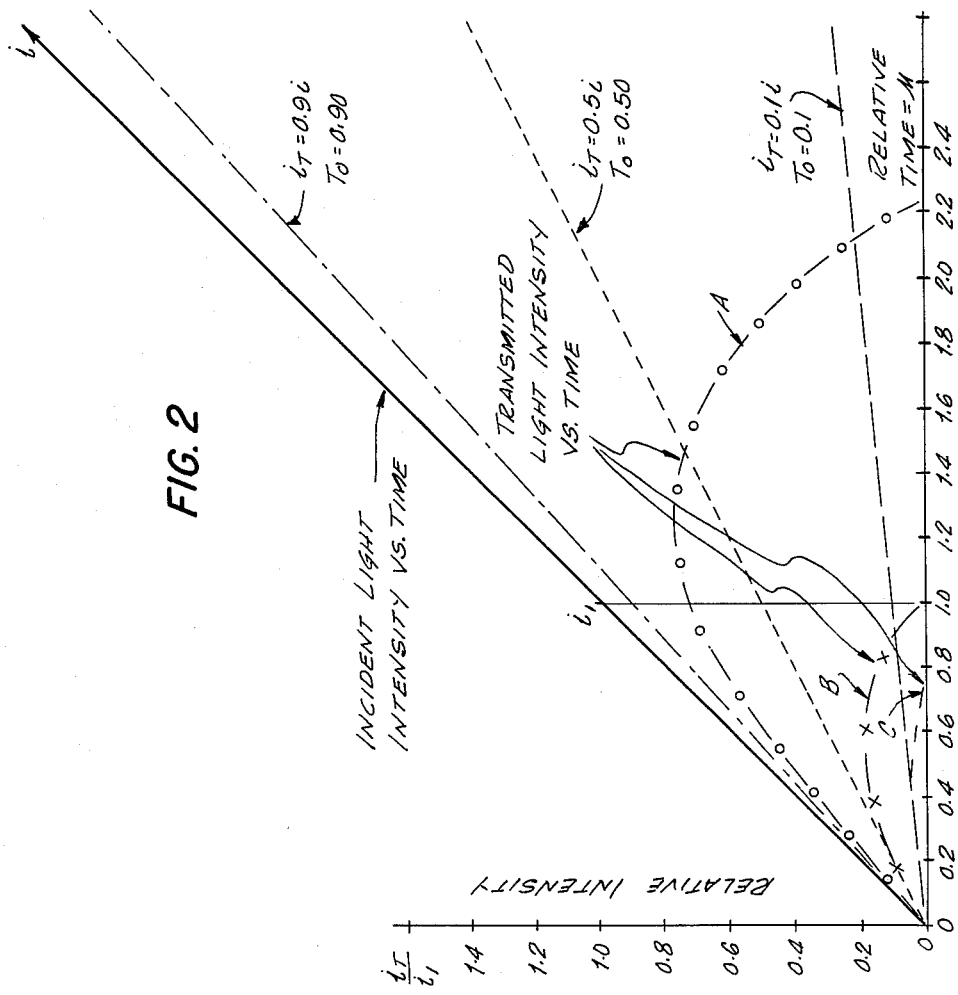
FIGURE 2 is a portion of the graph shown in FIGURE 1 on an enlarged scale.

The following terms defined below are used extensively herein:

"Photothermotropic composition" is a material which changes in light transmittance upon exposure to light and/or heat.

"Reversible photothermotropic composition" is a material in which the light transmittance decreases when the composition absorbs light or heat energy, and which returns to its initial transmittance when the energy is removed.

"Relaxation" is the partial or complete reversion to the initial transmittance of a reversible photothermotropic composition.

An "Opticel" is a hermetically sealed cell having a photothermotropic film supported within a suitable vapor atmosphere between spaced transparent windows.

An "inert polymer" is a polymer which has no grouping capable of entering into a photothermotropic reaction, but which serves to provide structural strength to the other constituents.

By a "meric" substance is meant a liquid, solid or polymeric gel material containing functional groups capable of entering into a photothermotropic reaction and which forms a dark complex with a transition metal halide.

A "merand" is a meric substance.

By a "polymer" is meant a polymer containing functional groups capable of entering into a photothermotropic reaction and which forms a dark complex with a transition metal halide.

By a "ligand" is meant a material, usually a liquid, which forms a transparent complex with a transition metal halide in a photothermotropic composition.

The term "VADO" as used herein is an acronym for a Variable Density Optical Device, and denotes a photothermotropic material of the invention which changes in transmittance upon the application or removal of light or heat.

By the term "VADOIC Ratio" of a photothermotropic film of this invention is meant the ratio of the optical density of the film in the dark state, to the optical density of the film in the transparent state.

"Sensitivity" is a measurement of the time rate of decrease of transmittance per unit transmittance, per unit of absorbed intensity; which is equivalent to the reciprocal of the energy per unit area required to completely opaque an initially transparent photothermotropic film.

The "Inherent Sensitivity" of a layer of photothermotropic material, is defined as the change in optical density per unit thickness, per unit temperature rise due to absorbed energy.

"Photothermotropic Sensitizer" is a material which when added to a photothermotropic composition, increases its sensitivity to light or heat.

In accordance with the present invention, photothermotropic compositions have been discovered comprising a transition metal halide, a ligand, and a meric substance which may comprise a liquid or a polymer. Compositions which include a transition metal halide, a liquid ligand, and a polymer, usually form a gel complex. Films of such compositions are particularly useful in photothermotropic devices according to this invention, showing a large decrease in transmittance on exposure to light or heat, and a rapid increase in transmittance when kept in the dark.

An example of a photothermotropic composition according to this invention is cupric bromide hydrate in polyvinyl alcohol-acetate copolymer. In the transparent or initial state, the water molecules of the composition associate with the cupric bromide to form a transparent cupric bromide-water complex within the polymer. Upon exposure to a light flash, the cupric bromide water complex disassociates and an opaque complex is formed between the cupric bromide and the polymer. The cupric bromide may also disassociate to form an inorganic CuBrCuBrCu-polymer parallel to and associated with the polymer chain. The water and free bromide and other constituents forming an opaque complex, as well as free bromine, hydrogen bromide, water, etc. may be retained within the polymer, or establish a reversible equilibrium within the sealed atmosphere. In this case cupric bromide is the transition metal halide, water is the ligand, and the polyvinyl alcohol acetate copolymer the complexing polymer or meric substance.

When a photothermotropic material undergoes transmittance changes, it is my understanding that various intra and intermolecular chemical and interbond reactions occur, accompanied by changes in quantum state and by atomic realignments. The material exhibits changes in conductivity with temperature which are characteristic of semiconductors. It also shows changes in conductivity with light intensity. Moreover, when stretch crystallized, the materials become polarizers when exposed to light or heat, and lose their polarizing properties when relaxed in the dark. The passage of a direct or alternating current through a layer of photothermotropic material prepared according to this invention will cause a change from the transparent state to the dark state because the ohmic loss increases the energy content of the material.

The behaviour of the photothermotropic material is very unusual since none of the transition metal halides, the ligands or the polymers, individually exhibit such photothermotropic properties.

The VADO effect depends on the ligand, choice of transition metal halide, the meric substance, and the presence or absence of sensitizer, as well as the proportions of these constituents. The meric substance may be a liquid or a polymer. Also of importance is the physical form or structure of the VADO film composition, i.e., thickness, supported or unsupported, laminated or not, and if mounted in a sealed atmosphere, the nature of the atmosphere in contact with the VADO film. Other factors such as impressed electric or electromagnetic fields and their frequency intensity and time duration may also be important in certain applications.

Among the transition metal halide-solvent-polymer-complexes which exhibit strong photothermotropic effects in accordance with the present invention, are those incorporating the chloride and bromide salts of copper, nickel, iron and cobalt. In the absence of applied light or heat, photothermotropic compositions including these salts generally form transparent complexes with a ligand such as water. A preferred transition metal halide and its associated ligand is cupric bromide and water respectively.

We have discovered that certain polymers possess functional groups which form stable complexes with the transition metal halides.

These complexing agents generally are organic polymers which have chromophoric or auxochromic groups. Representative of polymers which have auxochromic groups included in Table 6 are those containing hydroxyl groups such as polyvinyl alcohol; representative of polymers having chromophoric groups and included in Table 6 are those having carboxamide or carboxyl groups such as polyacrylamide and copolymers of polyvinyl acetate, respectively.

Other known auxochromic groups which might be expected to show similar effects are: di and mono substituted amino, halogen, methoxy, sulfide, sulfhydryl, selenyl and phosphate.

Other known chromophoric groups which might be expected to show similar results are: Oxime, nitrile, ketone, aldehydo, diazo, nitroso, nitro, indophenol, thiono, seleno, and telluro.

Repetitive groupings or combinations of groupings along the polymer chains are particularly effective as merands, as illustrated in Tables 5 and 6. Such groups function as electron donors, or furnish paths for electron transport thus producing light absorbing or reflecting complexes.

Double bonded oxygens periodically arranged along a chainlike organic or inorganic polymer, have been shown to result in photothermotropic films of the greatest sensitivity so far observed. Among the polymers which contain such functional groups and which are preferred herein, are water soluble polymers such as polyvinyl alcohol, (PVA), polyvinyl alcohol-acetate copolymer (HPVA-42), polyacrylamide (PAM), polyacrylamide-acrylate copolymer (PAMAC), methylvinylethermaleic anhydride copolymer (PVM/MA), polyvinylpyrrolidone (PVP), polyvinylpyrrolidone - vinyl - acetate copolymer, (PVP-VA), gelatin, dimethylhydantoin formaldehyde (DMHF) and poly-n-vinyl-5-methyl-2-oxazolidone (PNVMO). Water-insoluble polymers with the transition metal halides, such as polyvinyl butyral, polyvinyl acetaldehyde, have also shown a substantial VADO effect. Polyphosphoric acid is a liquid inorganic polymer containing periodically arranged double bonded oxygen groups. Since polyphosphoric acid is a liquid, it is usually employed in a gel-like solid solution with a transition metal-halide and an organc polymer. Polyphosphoric acid is an effective liquid inorganic merand.

Water is a preferred ligand for the metal halides, although other hydroxyl and carboxyl containing liquid ligands are also satisfactory; including for example, monohydric and dihydric alcohols such as methanol, ethylene glycol, and propylene glycol, and acids containing hydroxyl and carboxyl groups such as $\alpha$-hydroxybutyric acid and $\alpha$-hydroxy propionic acid (lactic acid).

In preparing films from solution, a mutual solvent is selected for all the components of the composition. Suitable solvents include water, methanol, propanol, formamide, acetone, methyl acetate, dimethyl sulfoxide, dimethylformamide and the like.

The photothermotropic composition may contain chemical substances which serve as sensitizers to increase the sensitivity to light or heat, the initial transmittance usually increasing simultaneously. These materials generally are selected from among alkali metal halides, such as sodium bromide and potassium bromide; acids, such as phosphoric acid; tin halides such as stannous chloride, ferric bromide, cobaltous bromide, nickelous chloride, nickelous bromide, chromic chloride and chromic bromide. Generally the sensitizers are added in amounts from 0.1 to 10% by weight of the composition.

Sensitivity and Relaxation Time Constant: The VADO reaction of photothermotropic compositions of the invention depends upon the chemical structures of the transition metal halide, the merand, the ligand and the sensitizer, and their relative proportions. The transparent complex is formed between the transition metal halide and the ligand at ambient or low energy content. The dark meric complex is formed between the transition metal halide and the merand at high energy content. Apparently the VADO effect is due to changes in bonding or changes in quantum levels of the ligand complex and meric complex of the photothermotropic material in response to varying energy content. The photothermotropic material may be a fluid solution, or a substantially solid gel if the merand is a polymer. Upon application of a given light intensity, the energy content of the photothermotropic composition increases with time and the transmittance decreases. In the absence of light intensity, or at low light intensity, the VADO composition loses energy to its surroundings and as the energy content of the composition decreases, the VADO reaction reverses and the transmittance increases. A simple mathematical-physical model of the VADO reaction has been devised, which has given considerable insight into the behavior or VADO reactions.

The resulting equations are in good agreement with experimental measurements and have led to useful definitions and formulae for quantitatively characterizing VADO reactions.

In general, to operate as a photothermotropic composition, the general composition must contain a transition metal halide, a ligand and a meric substance with or without a sensitizer. In any case, where a film is formed, there must be a functional or inert polymer which serves to retain the constituents in a substantially solid gel form. For a fluid photothermotropic composition, the meric substance is a liquid or a polymer in solution. For a film composition the meric substance is a polymer, and the ligand a liquid or solid, with all the constituents forming a more or less solid gel.

The photothermotropic film compositions of the present invention preferably have the following general composition in the stated range of proportions:

GENERAL COMPOSITION

| Component | Percent solids | Comments |
| --- | --- | --- |
| Transition metal halide | 10-80 | |
| Merand | 90-15 | Liquid or polymer optional. |
| Inert polymer or crosslinker | 0-25 | |
| Ligand | 10-40 | Constant, or variable optional. |
| Sensitizer | 0-10 | |

To prepare a photothermotropic composition which may be cast from solution to form a film or coating, a mutual solvent is chosen. The solvent is usually a mixture comprising water and an alcohol which, however, is determined by the choice of polymer. The polymer is dissolved to make 10–25% by weight, for example, by shaking for fifteen minutes in a standard paint agitator machine. The other constituents are then added and the shaking is repeated. The mixture then is allowed to stand for about an hour to eliminate bubbles, and then cast to a depth of for example 0.01 cm. on a suitable support. Next a film is formed by allowing the excess of solvent to evaporate from the coating, for example by being heated to 70° C. for about one-half to twelve hours.

The photothermotropic compositions of the present invention may be prepared in the form of supported or unsupported films. Thin support substrates for supported films are generally chosen from very transparent inert resins which are either compatible with the film composition, or insoluble in the solvent comprising the photothermotropic coating composition. Mylar or polyester film supports are preferred; however, paper, glass, and like supports also may be used.

Very thin supported photothermotropic films have higher sensitivity than photothermotropic films prepared on thicker supports, and greater strength than unsupported films.

The inert film support may be prepared in place on a temporary supporting surface to which it has poor adhesion, and subsequently stripped off. For example, a thin transparent inert support film of polystyrene can be prepared on a glass or Mylar with an overlayer of the photothermotropic film thereon and the composite film structure stripped from the temporary supporting surface to provide a supported photothermotropic film. Such films have the desirable properties of strength, high sensitivity and optical clarity. Suitable resin materials for use as transparent supports may be selected from among numerous plastics known in the art, including polyvinyl formal, polyvinyl butyral, polystyrene and polyester resins.

Unsupported photothermotropic films are prepared using constituents having the requisite strength characteristics. For linear chain molecules an increase in strength usually occurs with an increase in the molecular weight. The increase in strength with molecular weight is accompanied by increased chain length, greater degree of polymerization, higher viscosity in solution, and more cohesive gels. For example, a sensitive, self-supported photothermotropic film which has adequate strength and rigidity for satisfactory mounting may be prepared containing a mixture of polymers such as equal parts of a high molecular weight polyvinyl alcohol mixture with methyl vinyl ether maleic anhydride. Of course, the films must also contain a transition metal halide, a ligand, and optionally a sensitizer in suitable proportions as hereinafter set forth. These films are made by first coating onto a substrate such as Mylar or Teflon from which the desired film can be easily removed by stripping away from the substrate after drying.

Preferably the photothermotropic composition is prepared in the form of a coating on a (1–3 mil) support film which is sealed in an atmosphere of water vapor at 30–80% relative humidity in an Opticel. Under these conditions films have a transmittance of about 60–70% in the relaxed state. A supported photothermotropic film in an Opticel reacts in about 5 microseconds when exposed to a light flash from a Xenon source at such a distance as to receive an energy of approximately 2 joules/cm.$^2$ in 90 microseconds. Under these circumstances, the films darken to about 0.01% transmittance and about 90% of the flash energy is absorbed. The reaction is repeatedly reversible; the film returns quickly to its original transparent state after the flash.

Sensitivity is expressed hereinafter in units of (gm. cals./cm.$^2$)$^{-1}$.

An accurate value of sensitivity of a VADO film is best measured for an unsupported film subject to a high intensity flash. All other measurements show the sensitivity of the system, which includes the VADO film, its support, and surrounding atmosphere. With a VADO film in such a system, the available energy from radiation goes to heat the entire system, which thus reaches a temperature much lower than the temperature rise of an isolated unsupported VADO film. It is more accurate to compute the true VADO film sensitivity using optical density versus film temperature measurements using the Equation 33 which is set forth hereinafter.

For convenient comparison, unless otherwise stated hereinafter, sensitivity was measured for the specified photothermotropic film composition coated on a glass slide approximately 0.15 cm. thick. The sensitivity measurements were thus facilitated because the variation of transmittance is then slow enough to be readily observed without a recorder. The sensitivity is greatly increased for self-supported VADO films or for VADO films coated on thin supports, as is shown by the following Table 1:

film in free air. The VADO film is 0.00076 cm. thick on cellophane 0.0051 cm. thick.

(4) Steady illumination in free air onto an unsupported VADO film, 0.00125 cm. thick.

(5) Illumination by an intense flash of light from a No. 5 photoflash bulb, with reflector, at 18 cm., using unsupported VADO film 0.00125 cm. thick.

The inherent sensitivity was computed only for (5), since this was the only case where the film was unsupported, and in which the light intensity was high enough to assure substantially no energy loss to the support and to the surroundings. This is the only case in which the VADO film is sufficiently isolated from its surroundings to obtain a true sensitivity.

Addition of certain sensitizers to the photothermotropic composition produces an increase in sensitivity, and an increase in initial transmittance. For example, small percentages of stannous chloride, sodium bromide and potassium bromide increase the sensitivity up to 6 times and the transmittance up to 3 times.

Using stannous chloride as sensitizer, the initial sensitivity increases from 0.21 to 0% stannous chloride to a peak of about 1.20 for 0.75% stannous chloride, and then decreases rapidly to a sensitivity of 0.06 at about 8.5%. Accordingly, in this case the ratio of initial sensitivity to peak sensitivity is approximately 6/1. The transmittance increases with sensitivity at the same time from about 68% with 0% stannous chloride to about 85% with 1% stannous chloride. With sodium bromide as a sensitizer, the initial sensitivity increases from 0.10 to a peak of 0.14 as the content is increased from 0 to 2% in the composition. Above 2% the sensitivity of the film again decreases. At 8% sodium bromide the sensitivity is 0.075. The transmittance increases from 22% to 36% for an increase of sodium bromide from 0% to 2%. However, the transmittance again decreases, down to 21% when the sodium bromide concentration is increased from 2% to 3%.

Addition of potassium bromide in the same amount, produces an effect similar to that obtained with sodium bromide. Starting with a sensitivity of 0.10 at 0% potassium bromide, the sensitivity reaches a peak of 0.22 at 1% potassium bromide and thereafter decreases to 0.17 at 4.5% potassium bromide. Transmittance follows the increase in concentration of potassium bromide, being 31% at 0% potassium bromide and 61% at 1% potassium bromide.

Phosphoric acid also greatly increases the sensitivity and transmittance of the composition. $H_3PO_4$ may be written $(HO)_3P{=}O$, which by loss of water condenses to form polyphosphoric acid which has functional group- TABLE 1.—EFFECT OF SUPPORT THICKNESS AND LIGHT INTENSITY ON THE SENSITIVITY OF VADO FILMS

| Comment | See Note | Thickness L, cm. | Heat content c$\bar{3}$, gm.-cals./ °K.-cm.$^3$ | Intensity, gm.-cals./ cm.$^2$-sec. | Measured sensitivity (gm.-cals./ cm.$^2$)$^{-1}$ | Inherent sensitivity optical density change per °K.-cm. |
|---|---|---|---|---|---|---|
| Glass slide support | 1 | 0.150 | 0.304 | 0.15 | 0.0133 | |
| Do | 2 | 0.150 | 0.304 | 0.15 | 0.07 | |
| Film support | 3 | 0.0059 | 0.0031 | 0.15 | 0.27 | |
| Unsupported | 4 | 0.00125 | 0.905 | 0.041 | 1.90 | |
| Do | 5 | 0.00125 | 0.905 | 5.71 | 24.0 | 50 |

CONDITIONS OF TESTS IN TABLE 1

A 375 watt photoflood lamp at 3300° K. was used for the steady illuminant. The VADO film used for these tests was composition B, hereinafter set forth.

(1) Steady illumination with glass slide in constant temperature water cell. The thickness of the VADO film plus glass is 0.150 cm.

(2) Steady illumination of a VADO film on a 0.150 cm. thick glass slide in free air.

(3) Steady illumination of a thin supported VADO ings; that is periodically occurring double bonded oxygen groups along the chain, shown as follows:

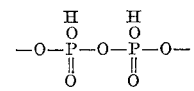

Thus while phosphoric acid acts as a sensitizer, up to 45% is required as compared to only about 1% of the examples of augmentors given above. More properly the polyphosphoric acid, because of its functional groups may be considered a liquid functional polymer or meric substance. When the phosphoric acid concentration of the composition is increased from 0% to about 43% the sensitivity increases about 4 times; and the transmittance correspondingly increases about 3 times. For example, in a film containing $CuBr_2$ and the polyvinyl alcohol-acetate alcohol copolymer, HPVA–42, the sensitivity is increased from about 0.12 for 0% phosphoric acid, to about 0.20 to 28% phosphoric acid. The sensitivity is 0.40 at 35% phosphoric acid, for the composition given in Example F.

Polyvinyl acetate resin, which has a substantial majority of acetyl groups as compared to hydroxyl groups, with cupric bromide and phosphoric acid, produces compositions in which the sensitivity increases from 0.075 for 0% phosphoric acid to 0.12 for 30% phosphoric acid. However, transmittance varies from 14% for 0% phosphoric acid to 64% for 30% phosphoric acid. In this case the phosphoric acid has a greater effect on transmittance than does the nature of the polymer.

A table of uncommon chemical materials used in the examples and the companies which manufacture them, follows:

TABLE 2

| Symbol | (CO) Polymers | Supplier | Supplier's code |
|---|---|---|---|
| PVM/MA | Methyl vinyl ether maleic anhydride. | General Aniline. | Gantrez–169. |
| PAMAC | Acrylamide-acrylic acid. | American Cyanamide. | Cyanamer P–250. |
| PAM | Polyacrylamide. | do | Cyanamer P–26. |
| PVP–20 | Polyvinyl pyrrolidone. | General Aniline. | PVP. |
| PVP–VA | Polyvinyl pyrrolidonevinyl acetate. | Antara | PVP-VA-1-735. |
| DMHF | Dimethyl hydantoin formaldehyde. | Glyco Chemical. | DMHF. |
| PNVMO | Poly-N-vinyl-5-Methyl-2-oxazolidinone (Devlex). | Dow Chemical. | Devlex 130. |
| Gelatin | Protein | Eastman | Gelatin. |
| PVA | Polyvinyl alcohol. | General Aniline. | PVA 52-22. |
| HPVA–42 | Polyvinyl alcohol-acetate. | Shawinigan | D–381. |

An example of a resin-transition metal halide photothermotropic composition in accordance with the present invention is the following:

*Example A*

| Constitutent | Percent by Weight | Percent of solids |
|---|---|---|
| Polyvinyl alcohol-acetate (HPVA–42) | 14.5 | 72.5 |
| Cupric chloride, hydrate ($2H_2O$) | 5.5 | 27.5 |
| n-Propanol | 35.0 | |
| Methanol | 40.0 | |
| Water | 5.0 | |
| Total solids (20%) | 100.0 | |

In the above typical formulation, the high molecular weight polyvinyl acetate alcohol copolymer containing about 70% acetate groups and about 30% hydroxyl groups complex with cupric chloride to provide a stable photothermotropic composition in which the cupric chloride is strongly bound to the polymer matrix. When prepared as thin films of the order of 0.0075 cm., this composition exhibits a photothermotropic effect which shows a peak opaquing rate at about 460 m$\mu$. Films of intermediate thickness, of the order of 0.015 cm., have a peak opaquing rate at about 510 m$\mu$. The peak relaxation rate occurs at approximately the same position as the peak opaquing rates for all thicknesses.

Cupric bromide may be substituted for cupric chloride in the above formula. Although the resulting composition is less effective in regard to rate of opaquing than the cupric chloride composition for a film of given initial transmission, a much thinner film of cupric bromide is required to obtain the same result.

Cupric bromide is highly soluble in the polyvinyl alcohol-acetate copolymer. This material having the composition shown in Example B, forms a clear, intensely brown colored film which has a white light transmittance of 28% for a thickness of 0.0025 cm.

*Example B*

| Material | Formula | Percent soilds | Percent solution |
|---|---|---|---|
| Polyvinyl alcohol-acetate | HPVA–42 | 70 | } 25 |
| Cupric bromide | $CuBr_2$ | 30 | |
| Equal parts methanol/n-propanol/water | | 100 | 75 |
| | | | 100 |

A film prepared according to Formula B and coated onto a glass slide approximately 0.15 cm. thick, was exposed in free air to sunlight having an intensity estimated at 0.0083 gm. cals./cm.$^2$-sec. with the following result:

| Exposure | Time, sec. | Percent white light transmittance |
|---|---|---|
| Initial | 0 | 15 |
| | 60 | 12 |
| | 120 | 11 |
| Recovery | 0 | 11 |
| | 60 | 12 |
| | 120 | 13 |

Calculated sensitivity: 0.47—Example B.

*Example C*

|  | Percent |
|---|---|
| Polyvinyl alcohol-acetate (HPVA–42) | 70 |
| Cupric bromide | 27 |
| Cupric chloride | 3 |
|  | 100 |

A photothermotropic film prepared according to Example C gave the following results when similarly exposed to sunlight:

| Exposure | Time, sec. | Percent white light transmittance |
|---|---|---|
| Initial | 0 | 45 |
| | 60 | 37 |
| | 120 | 30 |
| Recovery | 0 | 30 |
| | 60 | 32 |
| | 120 | 39 |

Calculated sensitivity: 0.65—Example C.

The light absorption of cupric bromide is so intense that a range of transmittance can be achieved by simply diluting the composition with solvent to produce thinner films. Mixtures of cupric chloride and cupric bromide in polyvinyl alcohol-acetate copolymer have a peak sensitivity at 80% cupric bromide and 20% cupric chloride which is 1.5 times greater than cupric chloride alone, and 1.2 times greater than cupric bromide alone in the film. The efficiency of mixtures of these salts is believed to be due to their complementary absorption of light energy whereby one salt absorbs energy in frequencies not used by the other salt.

Cupric bromide requires much less mass per unit area of film than cupric chloride, to obtain the same transmittance change. When transparent it permits the passage of light throughout a wider range of wavelength, and when opaquing it absorbs about the same wavelength band of light. For cupric chloride films the photothermotropic effect is a maximum at a wavelength of about 560 m$\mu$. Cupric bromide films display a maximum photothermotropic effect at 700 m$\mu$. When opaqued, both cupric chloride and cupric bromide absorb at least from 300 to 1000 m$\mu$.

Films made in accordance with the present invention show strong photothermotropism with rapid opaquing rates under strong light sources and rapid relaxation rates in the dark. These reactions are completely reversible even after repeated cycling of the same film. The photothermotropic reactions of the hydrates of cupric chloride and cupric bromide in the polymer matrix, for example, are in the center of the visible spectrum, and the variation of transmittance is of the order of 31.5% down to 0.001%. This corresponds to a VADOIC ratio of 10. High intensities of light accelerate the opaquing response. A single flash in the millisecond range from a photoflash lamp of 3800° K. color temperature at a distance of about 10 cm., for example, is sufficient to completely darken the film. At night levels of illumination there is no noticeable darkening of the films. However, in sunlight, the darkening is approximately proportional to intensity.

The sensitivity of films containing HPVA–42 polymer and cupric bromide reaches a maximum of 0.29 (gm. cals./cm.$^{-2}$)$^{-1}$, at a concentration of 54% by weight CuBr$_2$, with a 3300° K. light source, and even greater with bluer sources, such as sunlight.

The polymers which provide the highest sensitivity in combination with CuBr$_2$ include PAMAC, PVM/MA and PNVMO, with maximum sensitivities of 1.36, 1.23 and 1.11 respectively.

Polyacrylamide-acrylate copolymer (PAMAC)—CuBr$_2$ systems exhibit a peak sensitivity of 1.36 which occurs at 55–60% CuBr$_2$.

A highly sensitive VADO film is formed with cupric bromide and methylvinylether—maleic anhydride copolymer (PVM/MA) which opaques and relaxes rapidly. A sharp sensitivity peak of 1.23 is reached with 60% concentration of cupric bromide. The film forming quality of this system is excellent and is considered among the preferred ones of the invention. Mixtures of PVM/MA and PVA in 50/50 ratio also have desirable film forming properties suitable for unsupported films.

The system: poly - N - vinyl - 5-methyl-2-oxazolidinone (PNVMO)—cupric bromide shows a sharp sensitivity peak of 1.11 at 38% CuBr$_2$ concentration which is considered as a relatively high sensitivity at such a low salt concentration. Systems which show large VADO sensitivities at low salt concentrations tend to form stable systems; that is, films which will not crystallize or deteriorate; and hence this, and similar systems, are preferred.

Polyvinyl pyrrolidone (PVP-20) and cupric bromide in films show a peak sensitivity of 0.39 at a concentration of 25% CuBr$_2$.

A peak sensitivity of 0.37 is reached at 20% CuBr$_2$ concentration with polyvinylpyrrolidone-vinylacetate copolymer (PVP/VA)–7/3.

Aqueous solutions of dimethylhydantoin formaldehyde (DMHF) have very low viscosities even at high polymer concentrations. The film is hygroscopic, and becomes fluid when exposed to water vapor. A sensitivity of 0.30 occurs for the composition 15% CuBr$_2$–10% triethylene glycol 75% DMHF.

The system gelatin: CuBr$_2$ exhibits a sudden increase in sensitivity at 65% CuBr$_2$. A maximum sensitivity of 0.85 is reached at a concentration of 75% CuBr$_2$.

Polyvinyl alcohol resin and cupric bromide form excellent films having a maximum sensitivity of 0.59 at 33% salt concentration.

These results are summarized in Table 3.

TABLE 3.—VADO FILMS

[Maximum sensitivity and corresponding optimum concentration for cupric bromide in various polymers, sensitivity (gm. cals./cm.$^2$)$^{-1}$]

| Polymer | Concentration | Sensitivity |
| --- | --- | --- |
| HPVA–42 | 54 | 0.29 |
| PVM/MA | 60 | 1.23 |
| PAMAC | 55 | 1.36 |
| PVP–20 | 25 | 0.39 |
| PVP–VA 7/3 | 20 | 0.37 |
| DMHF | 16 | 0.30 |
| PNVMO | 38 | 1.11 |
| PVA | 33 | 0.59 |
| PAM | 83 | 0.81 |
| Gelatin | 75 | 0.85 |

The optimum salt concentrations for the VADO systems shown in Table 3 can be used to calculate the stoichiometric relationship between the salt and the polymer. This data, together with the nature of the functional groups of the polymer and their number per mer unit, are presented in Table 5. The mer structure of the VADO polymers is given in Table 6.

The following Table 4 illustrates the effect on film sensitivity of the use of a transition metal halide different than CuBr$_2$. In every case the ligand was water.

TABLE 4.—VADO FILMS

[Maximum sensitivity and corresponding salt concentration for salts other than CuBr$_2$, sensitivity (gm. cals./cm.$^2$)$^{-1}$]

| Salt | Polymer merand | Concentration | Sensitivity |
| --- | --- | --- | --- |
| CuCl$_2$ | PVM/MA | 50 | 0.69 |
| CuCl$_2$ | PVP | 40 | 0.38 |
| FeBr$_3$ | PNVMO | 33 | 0.37 |
| FeBr$_3$ | Gelatin | 80 | 0.38 |
| FeBr$_3$ | HPVA–42 | 45 | 0.14 |
| CoBr$_2$ | PVP | 57 | 0.33 |

The optimum concentration of transition metal halide and polymer for maximum sensitivity of the resultant photothermotropic film is presented in Table 5 below.

TABLE 5.—RELATIONSHIP BETWEEN CuBr$_2$ UPTAKE AND THE NUMBER AND NATURE OF THE FUNCTIONAL LIGAND GROUPS OF THE POLYMER

| Polymer | Moles of CuBr$_2$ per 1 mole mer of polymer | Functional ligand groups | No. of functional ligand groups per mer unit |
| --- | --- | --- | --- |
| HPVA–42 | 0.70 | $-OH$, $O=\overset{\underset{\mid}{O}}{C}$ | 2 |
| PVM/MA | 1.05 | $O=\overset{\mid}{C}-OH$, $OH-\overset{\mid}{C}=O$ | 2 |
| PAMAC | 0.74 | $-\overset{\overset{O}{\|}}{C}-OH$, $-\overset{\overset{O}{\|}}{C}-NH_2$ | 2 |
| PVP–20 | 0.16 | $-N-\overset{\mid}{C}=O$ | 1 |
| PVP/VA/7/3 | 0.23 | $-N-\overset{\mid}{C}=O$, $-\overset{\underset{\mid}{O}}{C}=O$ | 2 |
| DMHF | 0.12 | $-C=O$, $-N-$ | 2 |
| PNVMO | 0.35 | $\overset{-O}{N-\overset{\mid}{C}=O}$ | 1 |
| PVA | 0.10 | $-OH$ | 1 |
| PAM | 1.50 | $-\overset{\overset{NH_2}{\|}}{C}=O$ | 1 |

TABLE 6.—MER STRUCTURE OF POLYMERS WHICH FORM EFFECTIVE VALO FILMS

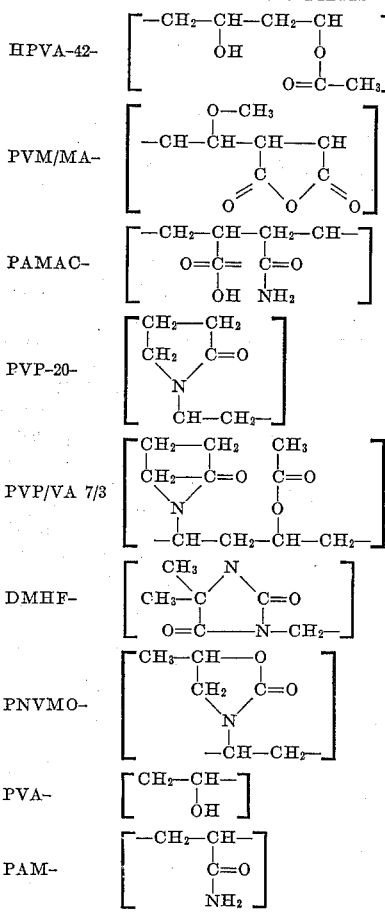

HPVA-42-, PVM/MA-, PAMAC-, PVP-20-, PVP/VA 7/3, DMHF-, PNVMO-, PVA-, PAM-

For an ideal case where it is sterically possible for all the groups to react, this formulation allows one $CuBr_2$ molecule for each two functional groups. As Table 5, shows, this 1:2 relationship is achieved only in the case of the polymer PVM/MA where the necessary complexing groups are supplied within one mer unit of the polymer, and no steric considerations are involved. PAMAC and HPVA-42 polymers also contain the necessary complexing groups within one mer unit and accordingly the 1:2 ratio is closely approximated. The other resins do not reach the 1:2 ratio because the two functional groups required for complexing can be provided by different polymer molecules and therefore complexing can occur only in the event of a favorable steric arrangement. The results shown in Table 5 also suggest that bonded hydroxyl and amino groups in the polymer are possibly less reactive because they are more fixed sterically.

The behavior of the photothermotropic films of the invention can be elucidated further with reference to ligand containing films. With such compositions the ligand remains permanently in the system while the changes in transmittance occur reversibly with temperature. This appears to substantiate that the transmittance changes observed with water-containing VADO films are primarily due to the breakdown of the salt-water complex within the film, and that evaporation effects are not the primary cause of the transmittance changes, although they may be an important contributing factor. The salt-water complex apparently breaks down and the water is adsorbed temporarily onto the polymer. The polymer simultaneously forms a light absorbing complex with the salt. When the temperature is reduced, the salt-water complex is re-established, and the transmittance increases while the polymer-salt complex disappears. Stated in another way, it is believed that in the transparent state the salt is present in a hydrated form, but upon losing water an opaque complex is formed with the polymer. Accordingly, the greatest light absorption occurs when all the functional groups of the polymer or ligand are saturated with transition metal halide. This is confirmed by the strong dependence of sensitivity on salt concentration.

The following Table 7 illustrates typical $CuBr_2$ containing systems with various fluid ligands which exhibit a reversible spectral change upon illumination. Water is listed for comparison purposes. VADO films may be prepared from these compositions by incorporating a suitable amount of a functional or non-functional polymer.

The photothermotropic compositions 1 through 5 shown in Table 7 constitute a reversible system utilizing fluid ligands much less volatile than water, or using a minor proportion of a volatile ligand which can be retained in the system.

TABLE 7.—FLUID VADO SYSTEMS

| Ligand | Boiling point, °C. | Parts by weight Composition No. | | | | | |
|---|---|---|---|---|---|---|---|
| | | 1 | 2 | 3 | 4 | 5 | 6 |
| Ethylene glycol | 197.9 | | 27.2 | 42.6 | | | |
| α-Hydroxy-propionic acid (lactic acid 85%) | Pure acid, $b_{15}$122 | | | | | 19.8 | |
| α-Hydroxy butyric acid | Subl. >60 | | | | 13.9 | | |
| $H_2O$ | 100° C | | | | | 0.5 | 4.4 |
| Transition metal halide: $CuBr_2$ | M.P. 498 | 0.34 | 1.5 | 1.2 | 2.1 | 0.9 | 1.0 |
| Merand: | | | | | | | |
| Dimethyl formamide | 153° | 99.66 | 71.3 | 56.2 | | | |
| N-propanol | 97.2 | | | | 84.0 | 75.8 | 94.6 |

After being incorporated with a polymer, the solvents of low boiling point in the solutions shown in Table 7, evaporate leaving a photothermotropic film composition containing a transition metal halide, a polymer and a ligand as a film upon a support such as a transparent sheet. Such coated supports may be laminated onto or between a transparent sheet forming a laminated photothermotropic product.

Thus, fluid VADO systems such as are shown in Table 7 are illustrative of those which may be incorporated in lieu of the plasticizer ordinarily employed with one or more of the polymers herein disclosed in a laminated sheet using transparent cover plates, and which may be laminated in a manner well known in the art.

Figure 1:
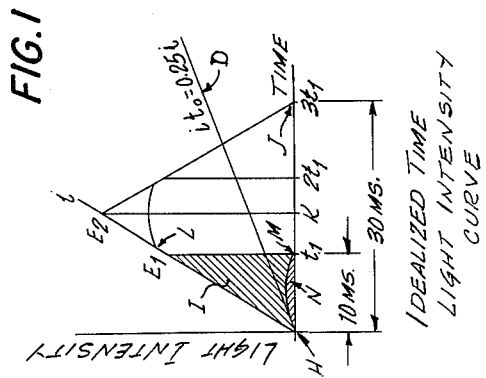
FIGURE 1 is an idealized graphical representation of a flash showing light intensities versus time and the absorbed and transmitted light intensities of a photothermotropic film made in accordance with the present invention.
Figure 3:
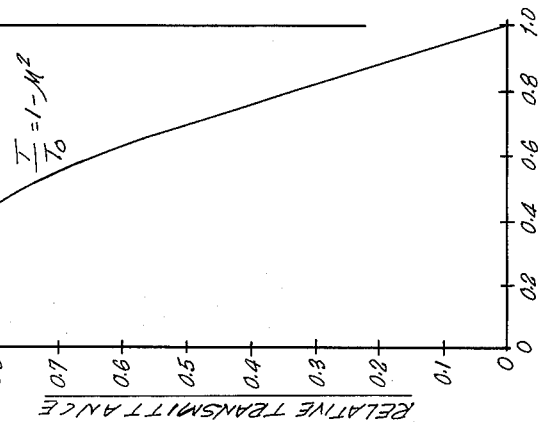
FIGURE 3 is a graphical representation of the response of relative transmission versus relative time for a flash whose intensity increases linearly with time.

In FIGURES 1 through 3 there are shown curves showing the response curves of photothermotropic films made in accordance with the present invention. FIGURE 1 shows an idealized time-light intensity curve made by a photoflash lamp through a photothermotropic film having an initial transmittance of 25%. The flash may be represented approximately by the large triangle. The line D whose slope is 0.25 shows the transmitted light intensity versus time at this transmittance. Tangent to this slope is the curve of light intensity transmitted through the VADO film versus time. The shaded area N shows the integrated light energy transmitted during the time $t_1$ through the photothermotropic film. The shaded area $l$ is the total light energy striking the photothermotropic film during the same time $t_1$.

FIGURE 2 shows the lower left hand portion of FIGURE 1 in more detail and to a larger scale. The light intensity is plotted as relative intensity and the time is plotted as relative time. Films having various values of initial transmittance are shown and the corresponding response curves for each initial transmittance are given. In particular, curve A is the response for a film having an initial transmittance of 90%; curve B is the response of a film having an initial transmittance of 50%; curve C is the response of a film having an initial transmittance of 10%.

FIGURE 3 shows the response of relative transmittance versus relative time for a flash whose intensity increases linearly with time. Such a flash is termed a ramp flash.

The data for FIGURE 4 was obtained from tests with a film having the composition of Example F, set forth hereinafter, coated on each side of a transparent film and mounted in a sealed Optical similar to that shown in FIGURE 14. A humectant film was coated on the inner face of the window facing the photothermotropic coating. The film was opaqued with the various stated values of constant light intensity from 0.017 to 0.148 gm. cal./cm.$^2$ sec. The relaxing portions of the curve were measured almost in the dark, utilizing such a small intensity of light as to not appreciably change the transmittance of the film during measurement. As the intensity of the incident light is increased, the film initially opaques more rapidly and then reaches equilibrium values of transmittance which decrease as the incident light intensity decreases.

For light intensity which is less than a critical value, the transmittance decreases, following a shallow hyperbola. For light intensity greater than the critical value, the curve is a deep hyperbola, which is due to an initially increased opaquing rate. At or near the critical value of light intensity, the curve is S-shaped; that is, has an inflection point.

It has been found possible to represent the curve of transmittance-time during dark relaxation by a mathematical formula which is set forth hereinafter. This formula is useful for calculating the relaxation characteristics in terms of initial transmittance (fully relaxed); final transmittance (fully opaqued) which is the same as the transmittance at the start of the relaxation, and a relaxation time constant $\tau$ which is characteristic of the photothermotropic composition, the sealed atmosphere composition, and the physical structure of the VADO cell. The relaxation time constant $\tau$ is a measure of the time rate at which the reaction reverses.

FIGURE 5 illustrates the application of the relaxation formula in the form of a log ratio of the transmittance ratios versus linear time plot. The curve A, plotted from experimental data, is linear, as predicted by theory.

However, above a certain transmittance the relaxation curve frequently shows a sharp break. This is illustrated by curves A and B which are linear, except at the break. The break point apparently corresponds wtih the transmittance at the inflection point on the opaquing curve at the critical intensity, as shown in FIGURE 4, and may represent a change in quantum level or in the type of reaction, which occurs during the process.

Figure 6:
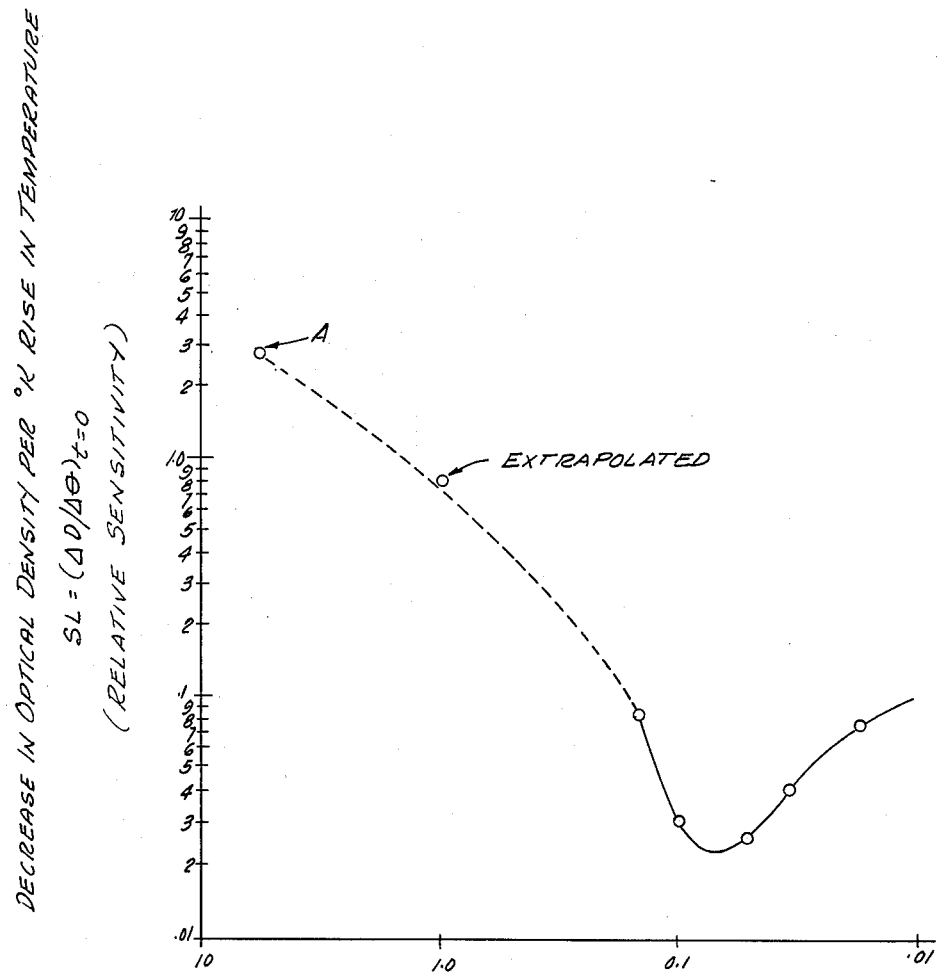
FIGURE 6 is a graph of the decrease in optical density per degree Kelvin rise in temperature versus incident light intensity for a supported photothermotropic film in a device of this invention termed an "Opticel" hereinafter described.

This is further illustrated in FIGURE 6 which shows the incident light intensity versus the decrease in optical density per ° K. rise in temperature of the film, which was calculated from the measured sensitivity of the VADO film of Example F (see Equations 33 and 34). The sensitivity decreases as the intensity of light increases up to the critical intensity, and thereafter the sensitivity increases rapidly as the light intensity increases. Here again the minimum sensitivity appears to occur at or near the critical light intensity. The existence of a minimum in the sensitivity-intensity curve tends to stabilize the action of the film to light intensities up to the critical range, enabling the film to reach a moderate decrease in density for ambient light levels, and preventing the transmittance from decreasing rapidly and from running all the way down to total opacity for moderate incident light intensities. However, once the light intensity exceeds the critical light intensity, then the film rapidly continues to opaque until it reaches an optical density of 3 to 5 or more.

Figure 7:
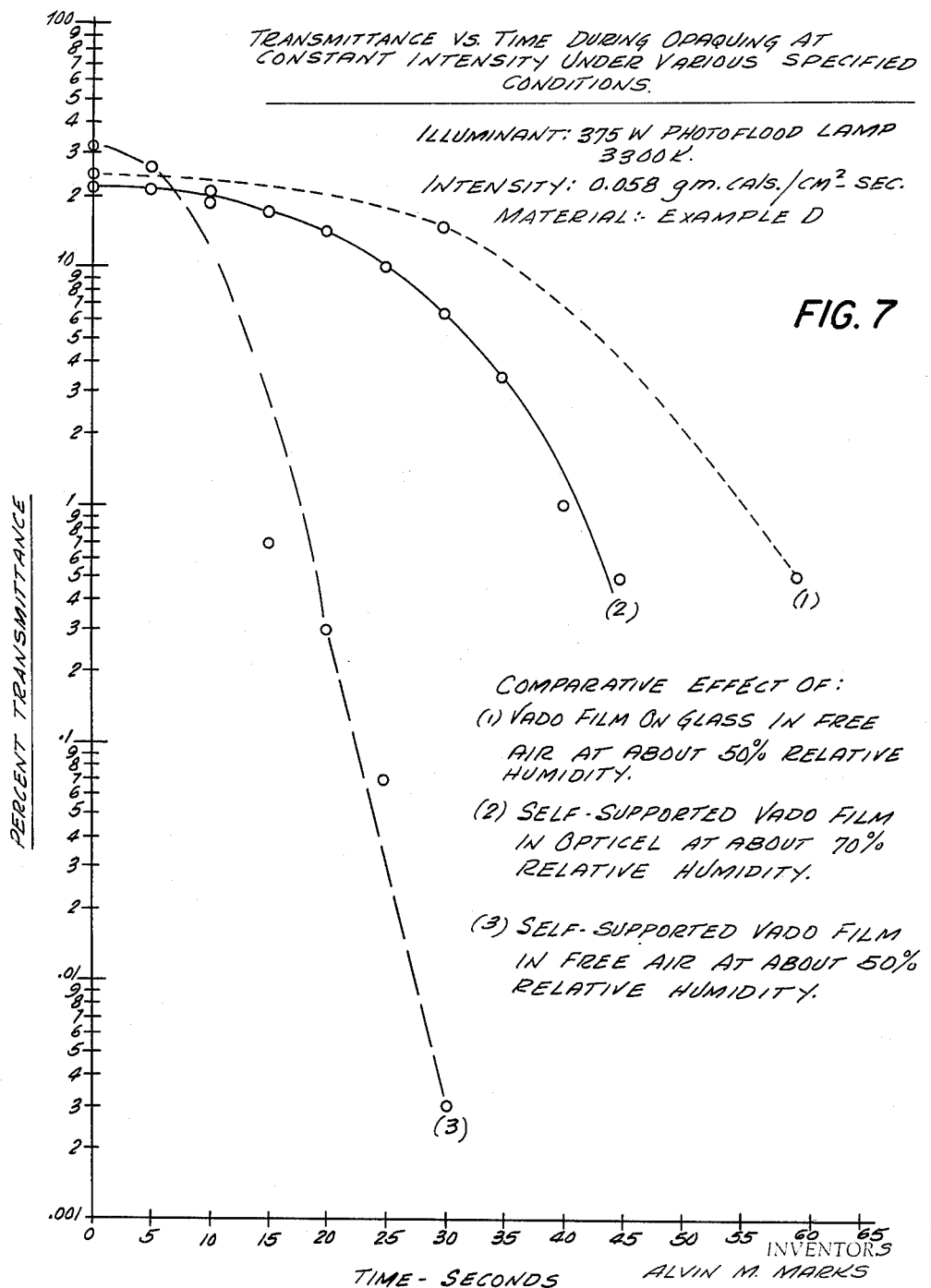
FIGURE 7 is still another graphical representation of transmittance versus time for a photothermotropic composition exposed to light at constant intensity under various specified conditions of operation.

FIGURE 7 shows three curves each showing transmittance versus time at a constant light intensity of 0.058 gm. cals./cm.$^2$-sec. for a photothermotropic composition of Example D under the following conditions:

Curve 1 shows the response of the film on glass in free air at about 50% relative humidity. The small sensitivity is due to excess water in the composition, which drives the equilibrium toward the transparent state, and the thick glass support which absorbs energy otherwise available in the film to increase its temperature.

Curve 2 shows the response for a self-supported film in an Opticel such as shown in FIGURE 14. The sensitivity is greater than for curve 1 because the film is self-supported. However, the sensitivity does not increase much because the vapor concentration in the Opticel was high (about 70% relative humidity), which increased the relaxation rate, tending partially to offset the opaquing rate.

Curve 3 shows the response of a self-supported film in free air at a constant relative humidity of approximately 50%. In this case the initial optical density was 0.5, the final optical density was 4.5, and the VADOIC ratio was $(4.5/0.5)=9$.

The initial slope of the curve is gradual; but, however, after 10 seconds the slope of the curve increases greatly and remains constant. Over the portion of the curve where the slope is greatest, the transmittance decreased from 31% to 1% in 7.5 seconds. Using Equation 24, which is hereinafter set forth, the sensitivity $S=3.3$ was computed from this data. The sensitivity for curve 3 is much greater than the sensitivities of curves 1 and 2.

The effect of atmospheric water content is further illustrated in FIGURE 8 showing three curves each being for transmittance versus time at a constant light intensity of 0.04 gm. cals./cm.$^2$-sec. for a self-supported VADO film of Example D in free air at various moisture contents. Curve 4 is for a large moisture content of about 70% relative humidity; curve 5 for a moderate moisture content of about 50% relative humidity; and curve 6 for small moisture content of about 30% relative humidity. Except for the curve 6 which has a smallest moisture content, the curves have an initial small slope, followed by a large slope. However, curve 6 does not have an initial section of small slope; the large slope occurs immediately. Over the portions of the curves where the large slope occurs, all of the curves 4, 5 and 6 are approximately parallel. For the curves 4 and 5, the initial portions of the curve, which have a small slope, correspond to a lag time before the maximum opaquing rate is achieved. The moisture content is successively decreased in curves 4, 5 and 6, and correspondingly the lag time is decreased, reaching zero for the curve 6.

The initial gradual slope of the curve 4 may be approximated by a line F1-F2. The lower portion of the curve may be approximated by another straight line F2-F3 of the greater slope. The time $t_F$ represents time up to the intersection point F2 which corresponds to the lag time required before the film has reached maximum opaquing rate. The same remarks apply to curve 5, there being a lag time $t_G$ up to the intersection point $G_2$ of lines $G_1$–$G_2$ and $G_2$–$G_3$.

Curve 6 has a zero lag time, and the maximum opaquing rate occurs immediately.

These results show that when the atmosphere in contact with the VADO film has a large moisture content an excess water equilibrium is established within the VADO film, which impedes the formation of the highly absorbing complex. The lag time appears particularly upon exposure to incident light within a certain range of constant intensity as may be seen for the curve taken with an intensity of 0.098 gm. cals./cm.$^2$-sec. This lag time increases with the moisture content of the atmosphere. The lag time represents the time required before the optimum moisture content of the film is reached or until a sufficient film temperature is reached to assure disassociation of the transparent complex under the existing conditions.

It is evident from this, therefore, that atmospheric and/or internal conditions of the VADO film should be regulated so as to assure the presence of optimum moisture content in the VADO film to avoid the initial lag time. In other cases where the VADO system is not in contact with the atmosphere as in the case of a fluid system or laminate, the ligand, which may or may not be water, must be present in optimum quantity to assure a maximum sensitivity without a lag time.

It will be understood that the point H1 on the zero lag time curve 6 can be adjusted to any initial transmittance by varying the thickness of the film at constant water proportion. For a given film thickness with the optimum water proportion, initial transmittance is less than for greater water proportions, as may be seen by comparing curves 4, 5 and 6.

Curve 6 at H1 shows a transmittance of 15% at a thickness of 0.0018 cm. For example, with this same VADO composition if an initial transmittance of about 50% is required at the optimum percent water content, the film thickness should then be about 0.0007 cm. The advantage of reducing the thickness of the film is that the film response is facilitated. Thinner films are more sensitive because absorption of a given quantity of energy will result in a larger temperature change, and hence a larger change in transmittance. Upon absorption of energy, thin films more readily emit water vapor which aids in driving the equilibrium toward the dark state. Moreover, thinner films will relax more quickly since the vapor from the surrounding atmosphere will penetrate more quickly into a thin film and drive the equilibrium in the reverse direction back to the transparent state.

FIGURE 9 shows a photothermotropic film composition 21 on a support 22. Support 22 is preferably thin and may be of the order of the thickness of the VADO film. The thickness of the support 22 is a design factor which may be varied according to the requirements. The thickness of the VADO film composition 21 is usually determined by the requirement to achieve maximum opaquing and relaxing rates.

Equation 24, hereinafter set forth, shows that to achieve a maximum opaquing rate with a VADO film of given sensitivity, exposed to a light source of a given intensity, the initial transmittance of the VADO film should be 50%.

FIGURE 10 shows two VADO films 23 and 24 coated on each surface of a thin supporting member 25. The VADO films 23 and 24 each have transmittances of approximately 70.7% so that the total transmittance is approximately 50%. For the same composition the thicknesses of the VADO films 23 and 24 in FIGURE 10 are, therefore, one-half the film thickness of the VADO film in FIGURE 9.

In this connection the structure shown in FIGURE 10 will provide a greater sensitivity during opaquing, and a smaller dark relaxation time constant, than the structure shown in FIGURE 9 particularly when incorporated in the Opticel structure as shown in FIGURE 14. This is because ligands such as water or methanol can be more readily evaporated from or adsorbed into thinner films.

FIGURE 11 shows a reversible VADO film 26 laminated between two glass or plastic transparent supports 27 and 28 which provide an impervious barrier. VADO composition 26 is such that either of two complexes may be formed within the composition: a transition metal halide-ligand complex having a small absorption constant and which is present at low energy levels; or a transition metal halide-meric (or polymer) complex which has a high absorption content and which is present at high energy levels. The water or other ligand remains within the structure and the transition metal halide exchanges association with the ligand or with the merand (polymer) of the VADO film to provide complexes having small or large absorption constants respectively.

The ligands employed are generally liquids. High boiling ligands will be preferred in all embodiments where vapor interchange with the surrounding atmosphere is not intended, such as in FIGURE 11. When the ligand is employed in a VADO composition for inclusion in a laminate, as shown at 26 in FIGURE 11, then the ligand may be such as to constitute a plasticizer as well as a ligand. As a plasticizer the ligands may assist in the forming of an elastic gel with adhesive properties such as is commonly employed in safety glass laminations. All of the constituents of the VADO film are mutually compatible, forming a solution within the gel structure constituting the adhesive layer of the laminate.

FIGURE 12 shows a thin cell containing a VADO liquid 31 between transparent windows 29 and 30. The VADO liquid has a small absorption constant when the liquid has a small energy content, and a large absorption constant when the liquid has a large energy content. In the reversible process, during opaquing or relaxing, the ligand respectively disassociates or associates from the transition metal halide and remains within the VADO liquid.

FIGURE 13 shows a curved lens suitable for ophthalmic purposes which incorporates a VADO film.

A gasket 33 between lenses 32 and 35 provides a sealed space 34 containing the ligand vapor under a suitable partial pressure. The lens 32 may be plano meniscus, or have specific prescription curvatures. A VADO film 36 is provided on the inner face of a thin plano meniscus lens 35. The lens 35 may be of thin plastic, say 0.02/cm. thick, which will enable it to readily respond to incident radiation with a temperature change such as to induce a substantial change in transmittance. Alternatively the structures of FIGURE 9, 11 or 12 may be employed in an ophthalmic lens.

FIGURE 14 shows a VADO device comprising a central support 39 film having on each surface thereof reversible VADO compositions 23 and 24 and separated from two cover plates 37 and 38 by suitable gaskets 42 and 43. The VADO films 23 and 24 on the support film 39, shown enlarged in FIGURE 10, comprise the central member of the device shown in FIGURE 14. This central member is preferably thin so that upon absorbing energy temperature variations can occur more rapidly, with resulting large changes in transmittance.

Alternatively, the structures shown in FIGURE 9, 11 or 12 may be employed as the central member in the device shown in FIGURE 14.

Where the VADO films are sealed within an envelope in contact with an atmosphere the partial pressure of the ligand vapor is important. To avoid condensation of the ligand vapor onto the windows of the device the windows may be coated with transparent humectant films 44 and 45 which are capable of readily absorbing or emitting such vapor. Upon absorbing vapor, the humectant coating dissolves the vapor in the coating without the formation of droplets and re-emits it to form a vapor again as the VADO film reabsorbs the vapor.

While the humectant films have been successfully employed to avoid droplet formation by condensation on the windows, in certain cases the partial vapor pressure of the ligand vapor is small enough to make the use of the humectant films optional. The partial pressure of the ligand vapor normally present in the atmosphere in the space between the plates may be sufficient to provide a satisfactory relaxing rate yet small enough to avoid condensation.

If humectant films are used, they may for example comprise coatings derived from polyvinyl alcohol and glycerin in equal parts at 15% in a water solution. Such a solution may be coated to form thin humectant films 44 and 45 onto the inner faces of the windows 37 and 38. These humectant films are exposed before assembly to an atmosphere containing a ligand vapor at a suitable partial pressure for example, water vapor, at 60% to 90% relative humidity. Other well known films capable of interchange with a ligand vapor atmosphere may be alternately employed. It will be understood that the spacings shown in FIGURE 14 are by way of illustration. The actual spacing of these elements on each side of the central member may be of the order of 0.05 to 0.20 cm., or more for large area elements.

In the photothermotropic films described herein, the presence of an optimum proportion of a ligand such as water has an important influence on both the rates of opaquing and relaxing. For example, there is an optimum concentration of water within a VADO film for maximum opaquing and relaxing rates. When a very thin VADO film in an Opticel is subject to a burst of radiant energy, for example from a photoflash lamp, its temperature increases and vapor is emitted from the VADO film into the sealed atmosphere. Without the humectant films there is a greater increase in the partial vapor pressure in the sealed container.

Referring to the VADO devices in FIGURES 13 and 14, the function of the sealed atmosphere is to store the ligand vapor. The ligand vapor emitted from the VADO film during the opaquing time period is absorbed by the sealed atmosphere, and the ligand vapor is returned from the sealed atmosphere into the VADO film during the relaxing time period. There is no loss of vapor from the assembly during the life of the device. The VADO Opticel will operate repeatedly and reversibly indefinitely. After many cycles, upon relaxing back to its initial transparent state, the VADO Opticel shown in FIGURE 15 is capable of again responding to a flash of light. The relaxation rate is also rapid, returning to its initial transmittance in about 30 seconds. A No. 5 photoflash bulb is a convenient test source producing a flash that lasts for 30 milliseconds and which is rated at 20,000 lumen-seconds, or 24 watt seconds. As shown in FIGURE 1, the intensity time graph of this flash is roughly triangular in shape, reaching a peak in 15 milliseconds.

A VADO film having a sensitivity of 24 (gm. cals./cm$^2$)$^{-1}$ and 25% initial transmittance requires an energy $(1/S = E_1 = 0.057$ gm. cals./cm.$^2$ to cause total opaquing. When this VADO film is exposed to a No. 5 photoflash bulb in a reflector at a distance of 18 cm., total blackout of the VADO film occurred within 10 milliseconds, while the flash lasted for 30 milliseconds. Under these circumstances the following analysis applies.

From the geometry of FIGURE 1, the total energy transmitted through the VADO film is $E_T = 0.125 E_1$. However, $E_1 = 0.222 E_F$, where $E_F$ is the energy emitted by the flash over its total duration and incident on the VADO film which in this case was 0.257 gm. cals./cm.$^2$. Therefore, $E_T = 0.0278 E_F$; that is, only 2.78% of the total flash energy $E_F$ is transmitted through the VADO film, compared to 25% for a film having a constant 25% transmittance. In this case only about 11% of the total energy which would have reached the eye, actually does.

Figure 15:
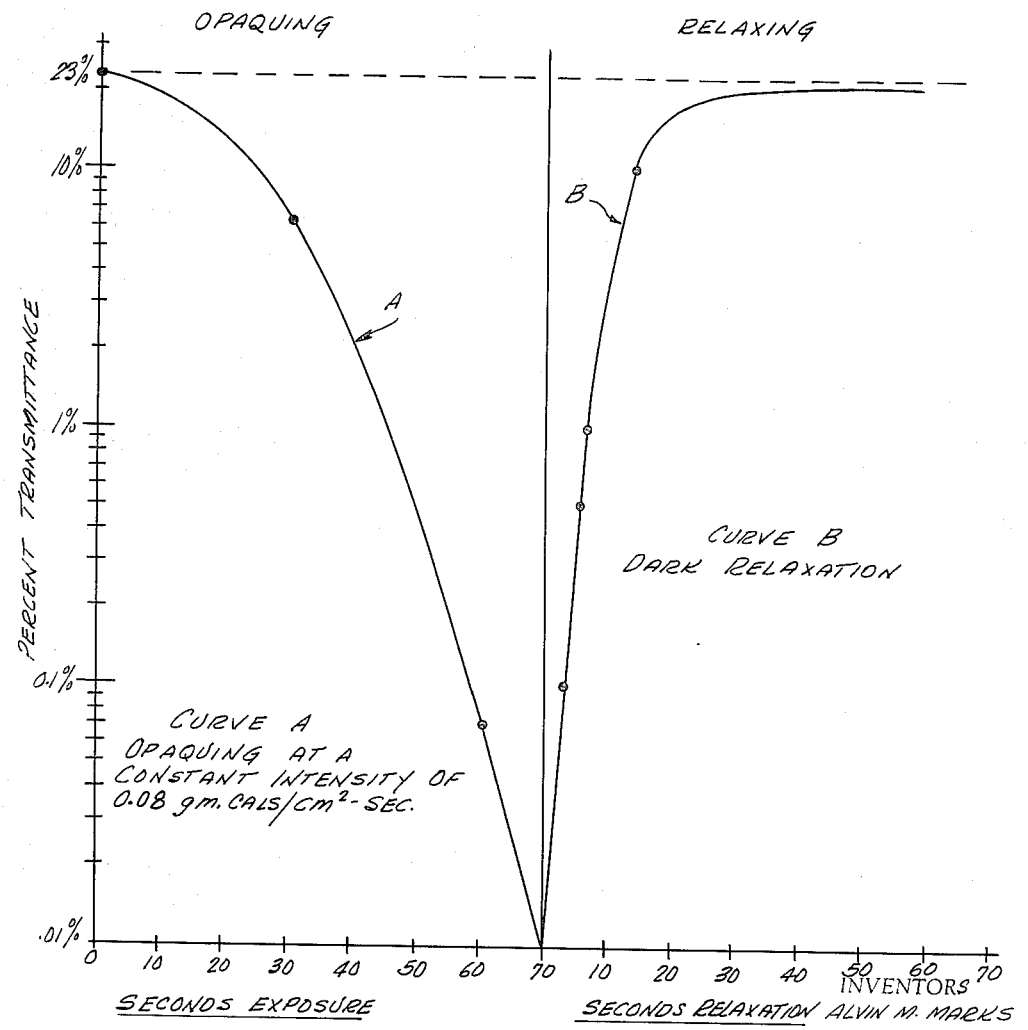
FIGURE 15 is a graph showing the transmittance versus time during opaquing and relaxation of another photothermotropic film made in accordance with the present invention.

FIGURE 15 shows transmittance versus time during opaquing and relaxation of a VADO film composition according to Example E for a double film mounted in an Opticel as shown in FIGURE 14. This Opticel contained water vapor at 60% relative humidity. In this example, the transmittance went from about 23% down to 0.01% within 70 seconds for a constant incident light intensity of 0.08 gm. cals./cm.$^2$-sec. The relaxation rate was rapid, providing substantially high visibility within ten seconds, while the return to substantially initial transmittance occurred within 30 seconds.

Figure 16:
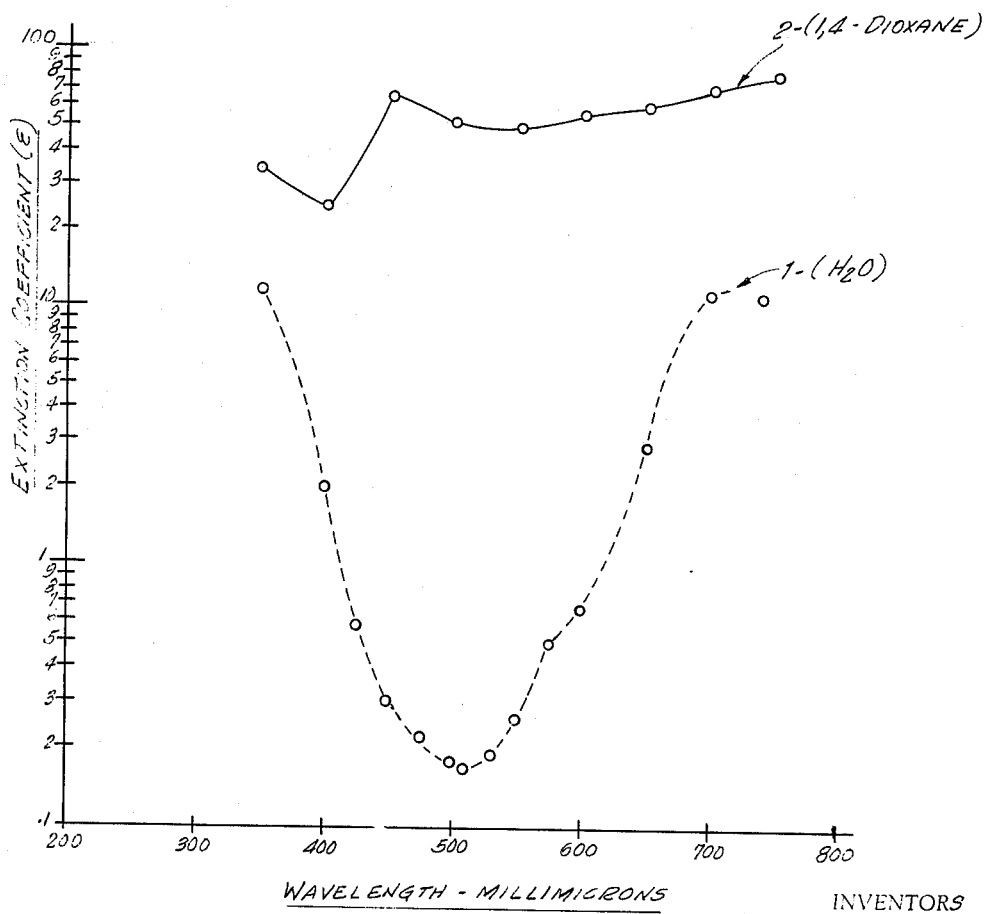
FIGURE 16 shows the absorption spectra of cupric bromide in water and in dioxane, which is illustrative of an effect utilized in the practice of this invention.

FIGURE 16 shows the absorption spectra of solutions of cupric bromide in water, and in dioxane. The composition of these solutions are given below in Examples M and N respectively. The figure shows that the light absorption of cupric bromide in the merand dioxane is almost uniformly very large, while the absorption of cupric bromide in the ligand water is very small, and reaches a minimum at about 510 m$\mu$. The extinction coefficient of cupric bromide in dioxane is of the order of 200 to 300 times that of the extinction coefficient of cupric bromide in water, from 450 to 550 m$\mu$. Consequently, mixtures of two solvents with properties similar to those shown in FIGURE 16 may be employed to show a VADO effect, provided the association of the cupric bromide with one or the other solvent is a function of incident light intensity and time. The absorbed energy appears as an increase in temperature of the VADO fluid, accompanied by a substantial change in transmittance.

FIGURE 17 illustrates this effect. Curve 1 is for the system shown in Example O which is a non-aqueous system. Curve 2 is a curve for Example P which employs very little water. For curve 2 is a rise in temperature of only 10° K. causes a decrease in transmittance from 16% to 2.5%. Curve 3 refers to Example Q which is also a non-aqueous system.

The following Table No. 8 summarizes the results:

TABLE 8.—CHANGE IN OPTICAL DENSITY PER ° K FOR CUPRIC BROMIDE VADO SOLUTIONS

| Figure 17 | Example | $\Delta D/\Delta \Theta$ | Ligand | Merand |
| --- | --- | --- | --- | --- |
| Curve No. 1 | O | 0.037 | $\alpha$-Hydroxy propionic acid-lactic acid. | n-Propanol. |
| Curve No. 2 | P | 0.061 | Water | Do. |
| Curve No. 3 | Q | 0.006 | $\alpha$-Hydroxy butyric acid. | Dimethyl formamide. |

The transmittance versus temperature characteristics shown in FIG. 17 for the fluid VADO systems, comprising solutions containing a transition metal halide, a ligand and a merand, are illustrative of the response for the class of such systems. Similar systems have been formed with cupric chloride, cobalt chloride and bromide, ferric chloride and bromide, as well as other transition metal halides. Examples of solutions which may be employed, include solvent ligands such as water; glycols, such as ethylene glycol and propylene glycol; acids, such as $\alpha$-hydroxy propionic acid (lactic acid), alpha hydroxybutyric acid; with meric solvents, for example, alcohols such as normal propanol; ketones such as acetone; amino fluids such as dimethyl formamide; ethers such as ethyl ether, and dioxane.

The invention will now be further illustrated with reference to the following additional examples, all of which exhibit substantial reversible VADO effects. The compositions may be cast to form photothermotropic films, and upon drying may be utilized as supported or unsupported films.

The VADO film composition shown in the following Example D was utilized to obtain the data for FIGURES 7 and 8.

Example D

| | Formula | Solids |
|---|---|---|
| Cupric bromide | $CuBr_2$ | 33 |
| Polyvinyl alcohol-acetate copolymer | HPVA-42 | 67 |
| | | 100 |

VADO film compositions which contain a substantial proportion of phosphoric acid, as for example, the compositions shown in the following Example E, exhibit another remarkable phenomena which we have termed the "variable reflectivity effect," which is of considerable importance in the application of such films to the protection of the eye from intense flashes. A VADO film of such composition which is initially highly transparent and then exposed to a light beam exceeding a critical intensity, first appears to have little or no reflectance as it commences to opaque. As substantial opacity is approached, this VADO film composition takes on a metallic appearance; that is, exhibits a high degree of specular reflectivity resembling the reflectivity of lead. During radiation there is also a substantial drop in the resistivity of the film. These phenomena appear to be caused by the copius introduction of free electrons and positive holes into conduction band level in the VADO film. This is a further illustration of the semi-conductor behaviour of the VADO film.

When a thin VADO film becomes opaque and totally absorptive (black), substantially all the incident radiant energy is absorbed and the temperature of the film increases. Incident radiation of sufficiently long duration and intensity, will char, burn and destroy the film, which thereafter will no longer protect.

A VADO film which upon opaquing also becomes substantially reflective, reflects away a substantial portion of the incident energy. The time required for the film to reach a temperature at which it will be destroyed is thus increased, and the ability of the VADO film to serve as a protection against prolonged intense radiation is enhanced. Consequently, VADO films which exhibit the variable reflectivity effect have a smaller probability of burn-out of the film upon exposure to prolonged intense flashes. Of course, the use of a number of VADO films along the light path will provide additional protection.

The VADO film composition of Example E, exhibits the variable reflectivity effect, and was utilized to obtain the data for FIGURE 15.

Example E

| Material | Formula | Percent solution | Percent solids |
|---|---|---|---|
| Polyvinyl alcohol-acetate copolymer | HPVA-42 | 7.2 | 42.9 |
| Cupric bromide | $CuBr_2$ | 4.3 | 25.6 |
| Phosphoric acid, 85% | $H_3PO_4$ | 6.2 | 31.5 |
| Water | $H_2O$ | 7.2 | |
| Methanol | | 75.1 | |

Figure 4:
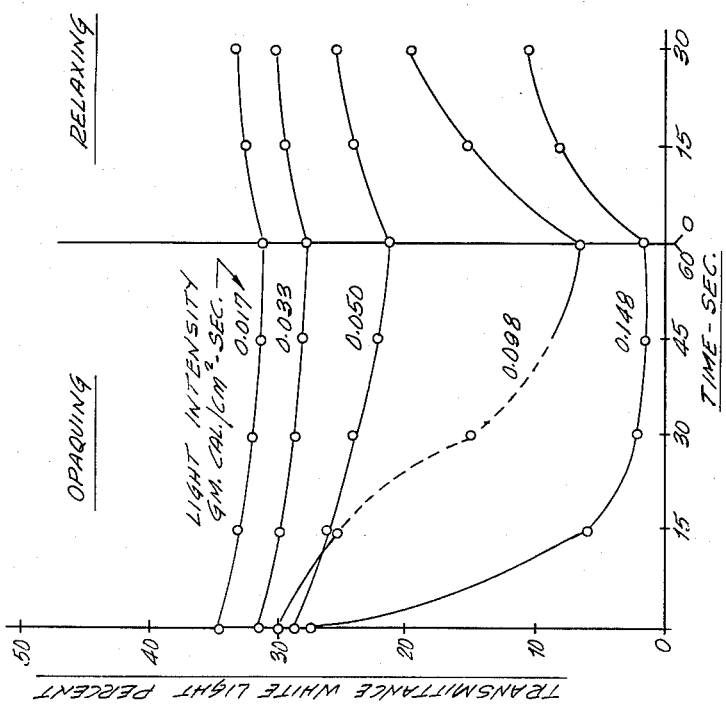
FIGURE 4 is a graphical representation of the performance of a photothermotropic film made in accordance with the present invention.

This VADO film of the following Example F was used to obtain the data shown on FIGURES 4, 5 and 6.

Example F

| Constituents | Formula | Amounts | Solids | Percent solids |
|---|---|---|---|---|
| Polyvinyl alcohol-acetate copolymer | HPVA-42 | 50.8 | 50.8 | 45.3 |
| Cupric bromide | $CuBr_2$ | 24.5 | 24.5 | 21.7 |
| Phosphoric acid | $H_3PO_4$ | 35 | 35 | 31.0 |
| Potassium bromide | KBr | 1 | 1 | 0.8 |
| Stannous chloride | $SnCl_2$ | 0.5 | 0.5 | 0.4 |
| Manganese bromide | $MnBr_2$ | 1 | 1 | 0.8 |
| Methanol | $CH_3OH$ | 140 | | |
| n-Propanol | $C_3H_7OH$ | 140 | | |
| Ethyl acetate | $CH_3COOC_2H_5$ | 7 | | |
| Water | $H_2O$ | 19.2 | | |
| | | 419.0 | 112.8 | 100.0 |

Percent solids = 100 (112.8/419.0) = 26.9.

Examples G through K which follow, show compositions utilizing various polymers in aproximately optimum proportions with supric bromide, or cupric bromide and cupric chloride.

Example G

| Material | Formula | Percent solids |
|---|---|---|
| Polymer | PVM/MA | 40 |
| Cupric chloride | $CuCl_2$ | 24 |
| Cupric bromide | $CuBr_2$ | 36 |

Example H

| Material | Formula | Percent solution | Percent solids |
|---|---|---|---|
| Polymer | PVM/MA | 7.7 | 40.0 |
| Cupric bromide | $CuBr_2$ | 11.5 | 60.0 |
| Ethanol | $C_2H_5OH$ | 3.8 | |
| Water | $H_2O$ | 77.0 | |
| | | 100.0 | 100.0 |

Example I

| Material | Formula | Percent solution | Percent solids |
|---|---|---|---|
| Polymer | PNVMO | 15.7 | 61.5 |
| Cupric bromide | $CuBr_2$ | 9.8 | 38.5 |
| Propanol, normal | $C_3H_7OH$ | 15.7 | |
| Water | $H_2O$ | 58.8 | |
| | | 100.0 | 100.0 |

Example J

| Material | Formula | Percent solution | Percent solids |
|---|---|---|---|
| Polymer | PAMAC | 7.5 | 44.4 |
| Cupric bromide | $CuBr_2$ | 9.5 | 55.6 |
| Propanol, normal | $C_3H_7OH$ | 7.5 | |
| Water | $H_2O$ | 75.5 | |
| | | 100.0 | 100.0 |

Example K

| Material | Formula | Percent solution | Percent solids |
|---|---|---|---|
| Polyvinyl alcohol | PVA | 11.5 | 60.0 |
| Cupric bromide | $CuBr_2$ | 7.7 | 40.0 |
| Propanol, normal | $C_3H_7OH$ | 19.2 | |
| Water | $H_2O$ | 61.6 | |
| | | 100.0 | 100.0 |

Example L

A thin strippable plastic support is prepared by mixing 16 parts polyvinyl butyral in 42 parts each of n-propanol and toluol and coating on a glass sheet. After evaporating the solvents, the plastic support is coated with a photothermotropic composition of this invention, such as given in the preceding examples. The resultant photothermotropic film on the plastic support is stripped from the glass.

Measurements of the extinction constants in FIGURE 16 were made on the following solutions typical of isolated transition metal halide-ligand, and transition metal halide-merand systems respectively.

Example M

| Material | Formula | Percent solution |
|---|---|---|
| Cupric bromide | $CuBr_2$ | 5.2 |
| Water (ligand) | $H_2O$ | 94.8 |
| | | 100.0 |

Example N

| Material | Formula | Percent solution |
|---|---|---|
| Cupric bromide | $CuBr_2$ | 0.58 |
| Dioxane (merand) | $O:(CH_2)_4:O$ | 99.42 |
| | | 100.00 |

The following are examples of fluid VADO compositions according to this invention, which were utilized to obtain the data for FIGURE 17.

Example O

| Material | Formula | Percent solution |
|---|---|---|
| Cupric bromide | $CuBr_2$ | .79 |
| α-Hydroxy propionic (lactic) acid | $CH_3CH(OH)COOH$ | 24.59 |
| n-Propanol | $C_3H_7OH$ | 74.62 |
| | | 100.00 |

Example P

| Material | Formula | Percent solution |
|---|---|---|
| Cupric bromide | $CuBr_2$ | 1.0 |
| n-Propanol | $C_3H_7OH$ | 94.6 |
| Water | $H_2O$ | 4.4 |
| | | 100.0 |

Example Q

| Material | Formula | Percent solution |
|---|---|---|
| Cupric bromide | $CuBr_2$ | 0.7 |
| α-Hydroxy butyric acid | $CH_3CH_2CH(OH)COOH$ | 21.8 |
| Dimethyl formamide | $HCO(N(CH_3)_2)$ | 77.5 |
| | | 100.0 |

Example R

A VADO film of the following composition was used for tests on the VADO reaction rate, referred to above:

| Material | Formula | Percent solids |
|---|---|---|
| Polyvinyl alcohol-acetate | HPVA-42 | 77 |
| Cupric chloride hydrate | $CuCl_2 \cdot 6H_2O$ | 23 |
| | | 100 |

Film thickness 0.0075 cm. on glass slide 0.15 cm. thick.

Example S

The following system is representative of a reversible photothermotropic fluid system comprising an inorganic merand, a non-aqueous ligand, and a transition metal halide. Polyphosphoric acid is the inorganic merand. The fluid comprises high boiler constituents entirely and may be enclosed in a fluid cell similar to that shown in FIGURE 12.

The formula is as follows:

| Material | Formula | Percent by weight |
|---|---|---|
| Propylene glycol | $CH_3CHOHCH_2OH$ | 88 |
| Phosphoric acid (85%) | $H_3PO_4$ | 7 |
| Cupric bromide | $CuBr_2$ | 5 |
| | | 100 |

A cell having a fluid layer thickness of 0.15 cm. showed a transmittance range of 22% to 0.9% for a temperature rise of from 25° C. to 77° C.

Another cell having an initial transmittance of 73% decreased to 37% upon a temperature rise from 25° C. to 67° C. The fluid layer thickness was 0.023 cm.

This system shows $\Delta D/\Delta\theta = 0.027$.

Example T

An example of a photothermotropic composition suitable for the formation of a gel laminate such as shown in FIGURE 11 is as follows:

| Material | Formula | Percent by weight |
|---|---|---|
| Polyvinyl alcohol | Elvanol 50-42 | 15.03 |
| Cupric bromide | $CuBr_2$ | 4.78 |
| Phosphoric acid | $H_3PO_4$ | 6.86 |
| n-Propanol | $C_3H_7OH$ | 18.54 |
| Water | $H_2O$ | 54.79 |
| | | 100.00 |

A cell containing a gel layer thickness of 0.15 cm. showed a transmittance range of 76% to 59% for a temperature use of from 25° C. to 63° C.

Example U

An example of an insert polymer which forms a gel with a ligand merand transition metal halide system is polysilicic acid. The polysilicic acid may be used alone or in combination with various polymers such as disclosed hereinbefore, which are inert or act as additional merand. The polysilicic acid used herein was prepared from a tetraethyl orthosilicate which if totally hydrolyzed contains 24% polysilicic acid and 76% ethyl alcohol. The hydrolyzed tetraethyl orthosilicate was prepared by vigorously shaking 85 parts by weight tetraorthosilicate and 15 parts by weight of water containing 1% HCl. The clear solution is heated to 55° C. for 1 hour and used when cooled within a few hours. The resulting composition is shown in brackets below:

| Material | Formula | Percent by weight |
|---|---|---|
| Propylene glycol | $CH_3CHOH \cdot CH_2OH$ | 43.7 |
| Polysilicic acid as | $(SiO_2)$ | 10.5 |
| Ethyl alcohol and minor amount of water | $C_2H_5OH$ / $H_2O$ | 33.0 |
| Cupric bromide | $CuBr_2$ | 6.0 |
| Lactic Acid | $CH_3CHOH \cdot CO_2H$ | 6.8 |
| | | 100.0 |

A cell containing a gel layer thickness of 0.02 cm. showed a transmittance range of 26% to 3% for a temperature rise from 25° C. to 62° C.; hence $(\Delta D/\Delta\theta) = 0.035$ density units/°K.

Example V

An example of an inorganic polymer acting as a merand with cupric bromide as the transition metal halide and propylene glycol as the ligand is as follows:

| Material | Formula | Solids | Percent solids |
|---|---|---|---|
| Polysilicic acid as | $(SiO_2)$ | 2.4 | 27 |
| Cupric bromide | $CuBr_2$ | 1.6 | 18 |
| Propylene glycol | $CH_3CHOH \cdot CH_2OH$ | 5.0 | 55 |
| | | 9.0 | 100 |

The above composition is fluid and may be coated on glass and the alcohol solvent dried. The coating then is a transparent brown color. On exposure to light the brown color darkens and then a blue black color develops. The surface of the coating takes on a bright metallic reflection. The system is reversible.

It has previously been shown that the VADO reaction may occur initially by the splitting off of the ligand from the metal halide, the metal halide thereafter becoming associated with the merand to form a dark complex in a higher energy state. However, the VADO process may occur in several stages which is illustrated by the following example: Consider cupric bromide, water as a ligand, and a suitable polymer as the merand. Initially, the water (ligand) splits away from the cupric bromide, and the cupric bromide associates with the merand at a higher energy level. Thereafter, at a still higher energy level the cupric bromide may disassociate to form cuprous bromide and free bromide. At an even higher energy state the cuprous bromide may be reduced to copper metal, which if sufficiently concentrated will give the sheet the characteristic reflectivity of the metal.

If these stages occur within a closed system, then the free bromine remains in the system. As the energy level is reduced, the bromine will eventually find its way back and combine with the copper metal and subsequently with the cuprous bromide. The steps are thus reversed, eventually reforming the transparent complex.

In the case where the metal halide is totally reduced to the metallic form, then the metal itself constitutes a light absorbing structure embedded within a transparent material. In this case the halogen may be considered the ligand which, in combination with the metal, is relatively transparent. A metal halide, upon absorbing light energy splits into a free ligand and a light absorbing (-ous or) metallic residue which is deposited within, adsorbed to, or complexed with the transparent matrix or merand. Upon return to a lower energy state, the halogen ligand may be reunited with the metal to form a relatively transparent molecule dissolved within the transparent matrix.

The above principles may also be applied to known light sensitive metal halides other than the transition metals, namely those of silver, mercury, gold, for example silver chloride, bromide and iodide; and mercuric and mercurous chlorides, bromides and iodides.

Generalizing:

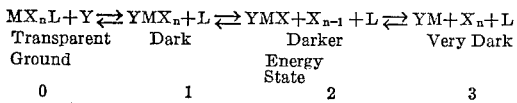

| Transparent | Dark | Darker Energy State | Very Dark |
|---|---|---|---|
| Ground | | | |
| 0 | 1 | 2 | 3 | where:
  M = metal capable of forming a light sensitive halide molecule of valence $n = 1, 2, 3 \ldots$
  Y = matrix which acts as a merand
  X = halide which acts as a ligand
  L = other ligand The intermediate state is absent when $n=1$. If the halide is the only ligand, then L is absent, and the 0th state is replaced by the first state.

Where the matrix is crystalline or contains crystallites within an amorphous phase, and where the metal halide is interspersed or dissolved within the crystalline structure or crystallite, then upon transition to the ous or metallic form, a particle alignment occurs forming an .. MXMX .. or an .. MMMM .. chain which is aligned with the crystalline or crystallite structure. If the crystallite structure is aligned and then forms a continuous crystalline phase, or if the crystallites are aligned within an amorphous matrix, then the light passing through such a structure is strongly polarized. When the structure returns to the lower energy state and the transparent form is reestablished, then the material loses its polarizing properties and transmitted light is not polarized.

Particularly where the halide is iodine or bromine, and where the polymer (for example polyvinyl alcohol or butyral) is capable of adsorbing the halide, the halide may be adsorbed to the crystalline polymer forming a .... YYY ... chain, which may exist parallel with the previously mentioned chains, and a light polarizing structure is again formed.

Where the crystallites exist, but are disoriented within the amorphous phase, then the material does not polarized transmitted light, but acts as a dark absorbing nonpolarizing material.

Most of the measurements made herein were incandescent light sources having a color temperature of 3800° K. However, it has been observed that light having a higher color temperature greatly increases the sensitivity of the VADO material. The effect of a great increase of sensitivity is to make the material apparently react with little or no apparent increase in temperature. This is true for materials which react with great sensitivity to ultraviolet light. The ultraviolet portion of the spectrum is much more effective than visible, infrared, or a thermally induced temperature rise in causing the disassociation of the metal halides. The mathematical-physics analysis set forth below is also useful for VADO effects of great sensitivity induced by ultraviolet light. Under these circumstances the temperature increase is correspondingly small but measurable. In other words the factor $(\Delta D/\Delta \theta)$ is wavelength sensitive, and in many cases increases for ultraviolet light.

For example, it has been found that the sensitivity of certain VADO films according to this invention, such as films prepared in accordance with Example E, exhibit an increase in sensitivity when exposed to sources rich in ultraviolet light.

For example, utilizing a light source which has a negligible ultraviolet component and a color temperature of 3400° K., an optical density change of 0.24 was recorded when the film was exposed at an intensity of .04 gm./cal./cm.$^2$/sec. for 3 minutes.

The same film exposed for an identical time interval to a Westinghouse 275 watt R.S. Sun Lamp at the identical intensity, changed by .41 density units.

The 3400° K. light source had little ultraviolet light but was comparatively rich in visible and infrared light, while the Sun Lamp source emits approximately 27% radiation at wavelengths below 400 m$\mu$.

Accordingly, if only ultraviolet light were used, it is estimated that the value of $\Delta D$ would be about 4 times the value obtained with the former light source.

Accordingly, particularly for windows and ophthalmic devices which are to be utilized outdoors and exposed to sunlight which contains a strong ultraviolet component. It is preferred to utilize an outer window or lens which readily transmits ultraviolet light so that the ultraviolet light can penetrate to the VADO layer with a resultant increase in sensitivity.

An outer layer transparent to ultraviolet light may be used, for example, in the structures shown in FIGURES 11, 12 and 13.

Most VADO films strongly absorb ultraviolet light and thus act as a filter to prevent the ultraviolet light from reaching the eye of the observer. However, it may be desirable to also incorporate in a layer between the VADO film and the eye, or in the VADO film itself, a quantity of ultraviolet absorbers such as are well known commercially for the purpose of providing additional protection for the eye.

From the foregoing, it will be seen that there has been provided photothermotropic compositions capable of opaquing substantially instantaneously upon exposure to a critical energy input of light and/or heat. These reactions are sufficiently rapid in their response to radiation to protect the eyes of the viewer from the effects of intense flashes of light, including a nuclear flash, yet are reversible, and such compositions return to transparency, and provide visibility a short time after the flash. These films are useful as variable optical transmittance elements for use in windows, windshields, eye glasses, as an automatic self-contained device for modulating transmitted light intensity, and the like. Other uses are foreseen, for example: in the graphic arts, for the temporary storage of images, instantaneous photography, recording media and the like.

A mathematical-physics analysis of the reaction of a VADO film during opaquing and relaxing, is presented in the following section. An idealized simplified model of the VADO phenomena is presented. The experimental data hereinbefore presented is approximately in agreement with the theoretical predictions of this model; but of course the actual phenomena is no doubt more complicated. This analysis leads to a definition of sensitivity and of dark relaxation time constant, as well as a better comprehension of the VADO phenomena, but is not intended to limit the scope of the invention.

LIST OF SYMBOLS $a$ = Transition metal halide
$b$ = Ligand (i.e., water, methanol, etc.)
$c$ = Polymer (merand)
$c_0 = c\delta L$—Heat capacity per unit area
$c\delta$ = Heat capacity per unit volume
$D$ = Optical density
$D_1$ = Optical density of VADO film in high transmittance State A
$D_2$ = Optical density of VADO film in low transmittance State B
$E$ = Total energy per unit area impinging on film from light sources
$E_1$ = Total incident energy required to opaque the VADO film (from initial transmittance to substantially 0% transmittance)
$E_A$ = Total absorbed energy required to opaque the VADO film (from initial transmittance to substantially 0% transmittance)
$E_a$ = The activation energy of the VADO reaction in kg. cal. mole$^{-1}$
$E_T$ = Total energy in flash transmitted through a VADO film
$E_F$ = Total energy contained in one flash
$h$ = Planck's constant
$i$ = Intensity of radiation at distance $x$
$i_0$ = Intensity of radiation at $x=0$
$i_T$ = Light intensity transmitted through a VADO film
$K$ = VADO reaction rate = $dp/dt$
$k_1$ = Opaquing constant
$k_2$ = Dark relaxation constant
$L$ = Film thickness
$m = m_1 + m_2$ = total mass of particles per unit volume of VADO film
$m_1$ = Mass of particles of State A per unit volume of VADO film
$m_2$ = Mass of particles of State B per unit volume of VADO film
$p = m_2/m$
$R$ = Arrhenius equation constant
$\bar{R}$ = Gas constant
$S$ = Sensitivity
$s$ = Inherent sensitivity
$T_1$ = Initial high transmittance of VADO film in State A
$T_2$ = Final low transmittance of VADO film in State B
$Tr$ = Relaxation transmittance
$t$ = Time
$t_1$ = Time for VADO film to totally opaque
$\alpha$ = Absorptivity = $(1-T)$
$\alpha_0$ = Absorptivity at time $t=0$
$\delta$ = Density of the film (mass/unit volume)
$\Delta E$ = Energy absorbed per unit area of film in time $\Delta t$
$\Delta \theta$ = Rise in temperature of the film
$\epsilon_1$ = Absorption constant in high transmittance State A
$\epsilon_2$ = Absorption constant in low transmittance State B
$\mu = t/t_1$ = relative time
$\nu$ = Frequency of light
$\theta$ = Temperature

TRANSMITTANCE VERSUS TIME, OPAQUING AND RELAXING (1) *Assumptions:*
 (a) The rate at which particles go from State A to State B is proportional to $i$ (the intensity of radiation).
 (b) The rate of return from B to A is independent of $i$.

(2) *Illumination—Opaquing equations:*

At $t=0$, there is a mass $m$ of particles of A per unit volume.

At $t=t$, there is a mass $m_1$ of particles of A per unit volume, and there is a mass $m_2$ of particles of B per unit volume, or:

$$m_1 + m_2 = m \text{ (a constant)} \qquad (1)$$

The net increase in B particles is then:

$$(dm_2/dt) = k_1(m-m_2)i - k_2 m_2 \qquad (2)$$

Let:

$$p = m_2/m \qquad (3)$$

Hence:

$$(dp/dt) = k_1(1-p)i - k_2 p \qquad (4)$$

or $$(dp/dt) = -(k_1 i + k_2)p + k_1 i \qquad (5)$$

A particular solution of the Equation 5 is:

$$p_c = k_1 i / (k_1 i + k_2) \qquad (6)$$

The general solution of Equation 5 is:

$$p_h = p_0 e^{-(k_1 i + k_2)t} \qquad (7)$$

where $p_0$ is an integration constant. The complete solution of Equation 5 is:

$$p = [k_1 i / (k_1 i + k_2)] + p_0 e^{-(k_1 i + k_2)t} \qquad (8)$$

To evaluate $p_0$ the following initial conditions are used in Equation 8:

$$t=0, \ p=0 \qquad (9)$$

$$0 = [k_1 i / (k_1 i + k_2)] + p_0 \qquad (10)$$

$$p = [k_1 i / (k_1 i + k_2)][i - e^{-(k_1 i + k_2)t}] \qquad (11)$$

If $i$ is the intensity after the radiation has traversed a distance $x$, then:

$$di = -mi[\epsilon_1 + (\epsilon_2 - \epsilon_1)p]dx \qquad (12)$$

or $$\int \frac{di}{i[\epsilon_1 + (\epsilon_2 - \epsilon_1)\{k_1 i/(k_1 i + k_2)\}\{l - e^{-(k_1 i + k_2)t}\}]} = \int -m\, dx \qquad (13)$$

Assume $$k_1 i \gg k_2 \qquad (14)$$

$$\epsilon_2 \gg \epsilon_1 \qquad (15)$$

$$\int \frac{di}{i[l + (\epsilon_2/\epsilon_1)(l - e^{-k_1 it})]} = -mE_1 x + C_1 \qquad (16)$$

Expanding the exponential to first order gives:

$$\int \frac{di}{i[l + (\epsilon_2/\epsilon_1) k_1 t i]} = -mE_1 x + C \qquad (17)$$

Integrating we get:

$$\ln \frac{i}{l + (\epsilon_2/\epsilon_1) k_1 t i} = -mE_1 x + C \qquad (18)$$

To evaluate C let:

$$i = i_0 \text{ at } x=0 \qquad (19)$$

which gives:

$$i(x, t) = \frac{i_0 e^{-m\epsilon_1 x}}{l + (\epsilon_2/\epsilon_1) k_1 t i_0 (l - e^{-m\epsilon_1 x})} \qquad (20)$$

Let $$S = (\epsilon_2/\epsilon_1) k_1 \qquad (21)$$

Then the solutions finally obtained are:

$$(dT/dt)_{t=0} = -ST_1(l - T_1)i \qquad (22)$$

$$T = T_0 / (l + S\alpha_1 E) \qquad (23)$$

(3) *Sensitivity:*

The sensitivity, S, of a photothermotropic film may now be defined from Equation 22:

$$S = [l/i(l-T)T][\Delta T/\Delta t] \qquad (24)$$

Equation 24 can be expressed in a useful form in terms of a change in optical density. Optical density is defined as:

$$D = \log_{10}(l/T) = \log_{10}(100/T_\%) \qquad (25)$$

Optical densities are proportional to the thickness L. The Equation 25 can be expressed in terms of natural logarithms (base $\epsilon$) thus:

$$D = 2.30 \ln (l/T) \qquad (26)$$

The energy absorbed per unit area of film is:

$$\Delta E = i(l-T)\Delta t \qquad (27)$$

From 24 and 27:

$$S = [(\Delta T/T)(l/\Delta E)] \qquad (28)$$

Let $\Delta E = E_A$, the energy to totally opaque the film, for which $\Delta T = T$.

The Equation (28) then becomes:

$$S = l/E_A \qquad (29)$$

Differentiating (26), and solving for $\Delta T/T$:

$$\Delta T/T = \Delta D/2.30 \qquad (30)$$

From 27, 28 and 30 there is obtained:

$$2.30S = [\Delta D/\Delta E] \qquad (31)$$

For a film thickness L, $\Delta E$ is the energy absorbed per unit area and $c\delta L$ is the heat capacity. Hence:

$$\Delta E = c\delta L\Delta\theta \qquad (32)$$

where $\Delta\theta$ is the rise in temperature of the film for an absorbed energy per unit area $\Delta E$ and for a corresponding change in optical density $\Delta D$.

The "Inherent Sensitivity," $s$, is defined as the change in optical density of a photothermotropic film per unit thickness, per ° K.

$$s = (\Delta D/L\Delta\theta) \qquad (33)$$

The relation between "Sensitivity" and "Inherent Sensitivity" now follows from 31, 32 and 33:

$$S = s/2.30\ c\delta \qquad (34)$$

Now $\Delta\theta$ represents an increase in temperature which corresponds to the energy absorbed per molecule. The absorbed energy may originate as light energy which upon degrading to thermal energy subsequently appears as a temperature rise.

The advantage of using the definition 33 for inherent sensitivity $s$ is that the measurement $\Delta\theta$ may be made equally well for a supported or unsupported photothermotropic film, and the same change in optical density $\Delta D$ will be observed, hence the same value of $s$ will be obtained in both cases.

While measurements are usually made in cgs. units with gm.-cal. and ° K.; it is important to also be able to compute values in MKS-° K. units, so that the values obtained can be correlated readily with electrical measurements.

*Example 1.*—Compute the inherent sensitivity $s$ for a self-supported film with the following characteristics:

| Units, cgs.-°K.-gm.-cal. | MKS-° K. (joules) |
|---|---|
| $L = 10^{-3}$ cm. $T_1 = 31.5\%$; $D_1 = .05$ $T_2 = 0.00315\%$; $D_2 = 3.5$ $\Delta D = 3.5 - 0.5 = 3.0$ $\theta_1 = 300°$ K. $\cong 27°$ C. ambient temperature $\theta_2 = 360°$ K. $= 87°$ C. final temperature $\Delta\theta = 60°$ K. Hence, using this assumed data in (10): $s = \Delta D/L\Delta\theta = 3.0/10^{-3} \times 60$ $s = 50$ units of optical density/° K.-cm. | $L = 10^{-5}$ m. 5,000/° K.-m. |

*Example 2.*—Given the data of Example 1 and $c\delta = 0.905$ gm.-cal./cm.$^3$, compute the sensitivity $S$, from 34:

| cgs.-gm.-cal.-° K. | MKS-° K. |
|---|---|
| $S = s/2.30\ c\delta = 50/2.30 \times 0.905$ $S = 24$ (gm.-cal./cm.$^2$)$^{-1}$ | $c\delta = 4.19 \times 0.905 \times 10^6$. $c\delta = 3.79 \times 10^6$ joules/m.$^3$ $S = 5000/2.30 \times 3.79 \times 10^6$. $S = 5.73 \times 10^{-4}$ (joules/m.$^3$)$^{-1}$. |

*Example 3.*—Assuming rapid opaquing along a straight line and the values assumed in the above example, compute the time $t_1$ required to reach maximum opacity in Example 1, in which $\Delta T = T$.

$i = 0.1$ gm.-cals./cm.$^2$-sec. (6 gm.-cals./cm.$^2$-min.): and
$S = 24$
$T_1 = 0.315$ From Equation 29 the energy absorbed by the film during opaquing is $E_A = l/S = 0.042$ gm.-cals./cm.$^2$. From 27 there is obtained:

$E_A = i(l - T_{ave})t_1$
$t_1 = l/i(l - T_{ave})S$ where $T_{ave} = T_1/2 = 0.157$
$t_1 = l/0.1(l - 0.157)\ 24 = 0.49$ sec.

(4) *Dark-Relaxation equations:*
 (a) After opaquing under illumination, with the VADO material relaxing B→A in the dark:

If in 4 $i = 0$; then:

$$dp/dt = -k_2 p: dp/p = -k_2 dt \qquad (35)$$

$$p = c_1 e^{-k_2 t} \qquad (36)$$

At the start of the relaxation time, a proportion $p_0$ has been converted to component B.
Let $p = p_0$; $t = 0$, then $c_1 = p_0$ $$p = p_0 e^{-k_2 t} \qquad (37)$$

Equation 37 is substituted in the combined exponential

TABLE OF UNITS AND CONVERSION FACTORS

| Name | Symbol | Unit, cgs.-°K.-gm.-cal. | Unit, MKS-°K. | Factor × |
|---|---|---|---|---|
| Temperature | T | ° K. | | |
| Heat capacity/unit volume | $c\delta$ | gm.-cal./cm.$^3$ | joules/m.$^3$ | $4.19 \times 10^6$ |
| Length | L | cm. | m. | $10^2$ |
| Energy | E | gm.-cal. | joule | 4.18 |
| Power-Intensity | P | gm.-cal./cm.$^2$-sec. | watts/m.$^2$ joule/m.$^2$-sec. | $4.18 \times 10^4$ |
| Inherent sensitivity | s | $\Delta D$/° K.-cm. | $\Delta D$/° K.-m. | $10^2$ |
| Sensitivity | S | (gm.-cal./cm.$^2$)$^{-1}$ | (joules/m.$^3$)$^{-1}$ | $2.38 \times 10^5$ | constant $[\epsilon_1+(\epsilon_2-\epsilon_1)p]$. From Beer's Law the relaxation transmittance, at time $t$, is:

$$T_r = e^{-[\epsilon_1+(\epsilon_2-\epsilon_1)p_0 e^{-k_2 t}]mL} \quad (38)$$

$$T_r = e^{-\epsilon_1 mL} e^{-(\epsilon_2-\epsilon_1)p_0 mL e^{-k_2 t}} \quad (39)$$

But $$T_0 = e^{-mL\epsilon_1} \quad (40)$$

Putting 40 into 39 and setting $t=0$, we obtain:

$$[\ln (T_0/T_r)]_{t=0} = (\epsilon_2-\epsilon_1)mLp_0 \quad (41)$$

Hence:

$$[\ln (T_0/T_r)] = [\ln (T_0/T_r)_{t=0}] e^{-k_2 t} \quad (42)$$

Hence:

$$\ln \ln (T_0/T_r) = [\ln \ln (T_0/T_r)_{t=0}] - k_2 t \quad (43)$$

Let:

$$Z = [\ln (T_0/T_r)_{t=0}]/\ln (T_0/T_r) \quad (44)$$

Then from 43 and 44, using factor 2.30 to convert the natural log to $\log_{10}$:

$$k_2 = (2.30/t) \log_{10} Z \quad (45)$$

The value of $k_2$ may be computed from the slope of the straight line obtained experimentally from plot of $\log_{10} Z$ versus time $t$ on a linear scale. Since $\tau = l/k_2$, then:

$$\tau = t/2.30 \log_{10} Z \quad (46)$$

If $Z = 10$, $\log_{10} Z = 1$, and $t$ is expressed in seconds, then:

$$\tau = t/2.30 \text{ [for } Z=10 \text{]} \quad (47)$$

Consequently if the straight line is extended to cut $Z=10$ on the graph, then the corresponding value of $t$ in seconds is equal to $\tau$, the dark relaxation time constant. For example for curve A in FIGURE 5, $\tau = 19$ sec. For FIGURE 15, a plot similar to FIGURE 5, yields $\tau = 12$ sec.

From Equation 42 putting $\tau = l/k_2$, there is obtained the explicit form of dark transmittance $T_r$, during relaxation, versus time:

$$T_r = T_0 (T_r/T_0)_{t=0}^{e^{-t/\tau}} \quad (48)$$

The value of $T_r$ at $t=\tau$ may be obtained by:

$$(T_r/T_0)_{t=\tau} = (T_r/T_0)_{t=0}^{1/e} \quad (49)$$

(5) *The absorption constants:*

The first absorption constant $\epsilon_1$ has a small value corresponding to State A.

The second absorption constant $\epsilon_2$ has a large value corresponding to State B.

State A corresponds to a high transmittance in the range 30 to 75% and State B corresponds to very low transmittance down to 0.001%, or an optical density of 5.

State A further corresponds to a low energy per unit volume which may be said to be at ground level; State B corresponds to an increased energy per unit volume, which may be said to be at a higher energy level.

(a) *First absorption constant $\epsilon_1$:*

The initial or first absorption constant $\epsilon_1$ may be determined from:

$$T_1 = e^{-\epsilon_1 mL} = e^{-\epsilon_1 w_v} \quad (50)$$

Solution for $\epsilon_1$:

$$\epsilon_1 = [\ln (l/T_1)]/w_v \quad (51)$$

*Example 4.*—Given the data from FIGURE 15 for a coating of Example F that $T_1=22\%$; $w_v=1.7\times 10^{-3}$ gms./cm.², there is obtained from Equation 51:

$$\epsilon_1 = [\ln l/0.22]/1.7 \times 10^{-3}$$
$$\epsilon_1 = 1.42/1.7 \times 10^{-3} = 837/\text{gm.-cm.}^{-2}$$

(b) *Second absorption constant $\epsilon_2$:*

The second absorption constant $\epsilon_2$ may be computed by submitting the film to radiation of sufficiently high intensity to produce maximum opacity.

*Example 5.*—Using the value of $\epsilon_1 = 837/\text{gm.-cm.}^{-2}$, compute $\epsilon_2$ from the data given in FIGURE 15.

The initial and final transmittance and the corresponding optical densities are:

Initial transmittance: $T_1 = 22\%$; $D_1 = 0.66$
Final transmittance: $T_2 = .001$; $D_2 = 4.0$ From these values we find:

$$(\epsilon_2/\epsilon_1) = D_2/D_1 = 4.0/0.66 = 6.07$$
$$\epsilon_2 = 6.07 \times 837 = 5080/\text{gm.-cm.}^{-2}$$

(6) *VADO Reaction rate:*

$$T = e^{-[\epsilon_1(1-p)+\epsilon_2 p]mL} \quad (52)$$

Differentiating Equation 52 with respect to time:

$$(dT/dt) = mL(\epsilon_1-\epsilon_2)T(dp/dt) \quad (53)$$

The reaction rate $= dm_2/dt$. Since $p = m_2/m$, the reaction rate is given by:

$$dm_2/dt = m(dp/dt) = mK \quad (54)$$

Since $m$ is constant $K$ is directly proportional to the reaction rate.

Putting 54 into 53 and solving for $K$:

$$K = [l/mL(\epsilon_1-\epsilon_2)T](dT/dt) \quad (55)$$

Experimental values taken at the same initial transmittance renders $T = T_1$ a constant; and since $\epsilon_1$, $\epsilon_2$, $m$ and $L$ are all constant, there is finally obtained:

$$K = (\text{constant})(dT/dt) \quad (56)$$

Hence in the Arrhenius equation:

$$\log K = E_a/2.3 R\theta + C \quad (57)$$

it is proven that:

$$\log (dT/dt) = -E_a/2.3 R\theta + C \quad (58)$$

(7) *Photothermotropic chemical equations:*

In cases where the VADO film is in contact with a gas, and where the ligand has appreciable vapor pressure, the system is initially in equilibrium, and a maximum concentration of ligand is present in the film. In this case $a$, $b$, and $c$ associate to form a stable complex in the transparent state, thus:

$$abc \quad (59)$$
transparent

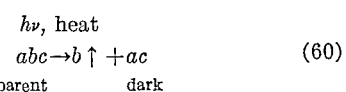

$$abc \xrightarrow{h\nu,\ \text{heat}} b\uparrow + ac \quad (60)$$
transparent $\quad\quad$ dark In the dark, the reaction 60 reverses as the ligand is absorbed from the surrounding atmosphere, which may be written:

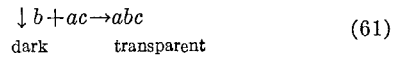

$$\downarrow b + ac \rightarrow abc \quad (61)$$
dark $\quad\quad$ transparent

A nonvolatile ligand may be used: for example, a fluid in a sealed chamber, a VADO film within an impervious glass laminate, or a nonvolatile plasticizer as a ligand in a VADO film. In these cases the reaction becomes:

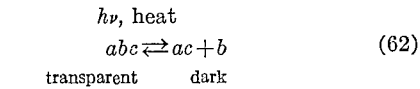

$$abc \xrightleftharpoons[]{h\nu,\ \text{heat}} ac + b \quad (62)$$
transparent $\quad\quad$ dark In these cases the components in the VADO film are the same in both the transparent and dark states but they associate differently in each state.

Since $a$ and $c$ are common to both sides of the equation, write $ac = d$, and obtain:

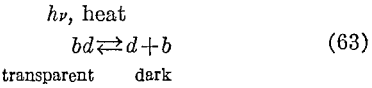

$$bd \xrightleftharpoons[]{h\nu,\ \text{heat}} d + b \quad (63)$$
transparent $\quad\quad$ dark Actually Equation 63 may be used in lieu of Equations 60 and 61 or 62. These equations are mathematically equivalent because the ligand $b$ is available reversibly either from the atmosphere or from the disassociated state within the composition.

(8) *The activation energy of a VADO film:*

A calculation of the activation energy of the VADO reaction for a composition of Example R has been made. Transmittance versus Time was plotted for the identical VADO slide tested at different temperatures.

It has been shown that a modified Arrhenius Equation 58 may be used; and that the overall reaction rate involving mass change of active material per unit time from the transparent state, to the dark state, may be measured, to a good approximation, by the time rate of change of Transmittance.

The activation energy of a film having the composition of Example R was determined from a plot of log K which was plotted versus reciprocal temperatures in degrees Kelvin, obtaining a straight line (not shown herein).

The activation energy was 8.2 kg. cal./mole for the temperature range between 60° and 80° C., and the constant C was 5.44 min.$^{-1}$.

The reaction described here is, of course, endothermic and reversible. Therefore, the activation energy is probably the heat of reaction and the Boltzman-Maxwell statistical term $\exp(-E_a/\bar{k}\theta)$ is descriptive of the mole fraction sites or molecules, in the opaque state at a given absolute temperature $\theta$.

If 8.2 kg. cal. per mole is required for the transparent to opaque transition, then the energy required for this transition of the VADO film is 0.057 gm. cals./cm.$^2$ (or 0.236 joules/cm.$^2$).

This value is considerably lower than the 0.108 gm. cals./cm.$^2$ (0.447 joules/cm.$^2$) calculated for the evaporation of all the water from the film, and confirms the hypothesis that the heat required to vaporize the water did not appear to substantially contribute to the VADO reaction.

Both these values of transition energy per unit area are regarded as higher than the corresponding values which would be applicable to VADO films of greater sensitivity. The films evaluated for this comparison were cupric chloride polyvinyl alcohol acetate films which are not as sensitive as the cupric bromide systems also disclosed herein.

While prolonged heating causes evaporation of water from the film, this is not necessarily an integral part of the VADO mechanism.

In those examples in which water is the ligand, the water molecules are part of the active molecular configuration. During a flash exposure the water molecules are disassociated from their ground state transparent configuration (low energy state), and a complex is formed from the cupric halide and the polymer in an opaque higher energy state. The water remains in the structure not associated with the complex.

The rapid opaquing which occurs in flash exposure conditions, tends to confirm this explanation since little evaporation could have occurred during the time of the flash.

(9) *Calculation of sensitivity, inherent sensitivity and the energy which is absorbed and transmitted by a photothermotropic composition for the idealized light flash shown in FIGURE 1:*

Such a flash is approximated by a No. 5 photoflash bulb which required 10 milliseconds to opaque a VADO film. The flash bulb was in a reflector and was 18 cm. from the bulb. The duration of the total flash was 30 milliseconds. This flash is represented in idealized form in FIGURE 1.

VADO compositions of this invention have electrical and optical properties which are characteristic of a semiconductor material. Transitions from the transparent state to the dark state occur by the adsorption of energy. The energy of electromagnetic radiation is effective in the ultraviolet, visible, infrared or microwave regions of the spectrum. Heat from a thermal source which causes a rise in temperature is also effective. In the case of radiation the energy is applied to the VADO film by the absorption of light photons. The light photons are absorbed within the VADO material and immediately give rise to transitions of state. However, the energy provided by the absorption of light photons is instantly converted to thermal energy within the VADO film, which causes a rise in the temperature of the film. Thus it is apparent that the radiation and thermal effects are indissolubly interconnected. When radiation is absorbed by the film it is always accompanied by temperature rise. The direct effect of the light photons in causing state transitions in the VADO film and the resultant rise in temperature of the VADO film, both act in the same direction to drive the equilibrium toward the dark state.

A volatile ligand may be used under physical conditions which permit evaporation of the ligand, as illustrated by the herein described Opticel.

Under these circumstances, when the VADO film absorbs energy in the form of light or heat, the ligand disassociates from the transition metal halide and evaporation of the ligand drives the equilibrium to the dark state. This is symbolized as follows:

A photothermotropic film of composition shown in Example B was subjected to the above flash. Data on specific heat and density follow for this example:

DATA.—SPECIFIC HEAT ($c$)

| Material | Specific heat, gm.-cals./° K.-gm. |
|---|---|
| CuBr$_2$ | 3.0 |
| D381 | 1.2 |
| Example | Average=0.52 |

DENSITY ($\delta$)

| Material | Density, gms./cm.$^3$ |
|---|---|
| CuBr$_2$ | 3.0 |
| D381 | 1.2 |
| Example | Average=1.74 |

To compute the absorbed energy $E_A$ required to opaque a self-supported VADO film of thickness $L=0.00125$ cm., which requires a 44° K. temperature rise to change the transmittance from $T_1=25\%$ to approximately 0%. $E_1$ is the incident energy to opaque the VADO film.

$c_0 = c\delta L = 0.52 \times 1.74 \times 1.25 \times 10^{-3}$
$\qquad\qquad = 1.13 \times 10^{-3}$ gm.-cals./cm.$^2$ $E_A = 44 \times 1.13 \times 10^{-3} = 0.050$ gm.-cals./cm.$^2$ $E_T = T_1 E_1/2 = E_1/8$ $E_A = E_1 - E_T = (7/8)E_1$ $E_1 = (8/7) \times 0.050 = 0.0571$ gm.-cals./cm.$^2$ $E_T = (E_1/8) = 0.50/8 = 0.00625$ gm.-cals./cm.$^2$ Computing the sensitivity S from 29:

$$S = 1/E_A = 1/0.050 = 20$$

Computing the inherent sensitivity $s$ from 34:

$s = 2.30 c\delta S = 2.30 \times 0.52 \times 1.74 \times 20 \cong 42$
$\qquad\qquad$ optical density units per ° K.-cm.

Assuming the idealized flash shown in FIGURE 1, the percent energy in the transmitted flash compared to the total energy in the incident flash $= (100\, E_T/E_F)$ and may be calculated thus:

$E_F$ = total energy in the entire flash, represented by the entire area of the triangle HE$_2$J.

From the geometry of FIGURE 1 there is obtained:

$$E_2 = E_1(t_2/t_1)^2 = E_1(1.5/1)^2 = 2.25 E_1$$

$$E_F = 2 \times 2.25 E_1 = 4.5 E_1$$

But in this example for $T_1 = 0.25$:

$$E_T = 1/8 E_1$$

Hence:

$$100 E_T / E_F = 100(1/8 E_1)/4.5 E_1 = 2.78\%$$

$$E_F = 4.5 E_1 = 4.5 \times 0.0571 = 0.257 \text{ gm.-cals./cm.}^2$$

The total energy in transmitted flash is:

$$E_T = (1/8) E_1 = 0.057 \times 1/8 = 0.0071 \text{ gm.-cals./cm.}^2$$

Having thus fully described the invention, what is desired to be claimed and secured by United States Letters Patent is:

1. A photothermotropic composition consisting of in a solid solution a transition metal halide, a ligand reversibly reactive with said transition metal halide to form a transparent homogeneous complex when the photothermotropic composition is in a low energy state, and a merand reversibly reactive with the said transition metal halide to form an opaque homogeneous complex when the photothermotropic composition is in a high energy state.

2. A photothermotropic composition consisting of in a solid solution a transition metal halide, a ligand reversibly reactive with said transition metal halide to form a transparent homogeneous complex when the photothermotropic composition is in a low energy state, and a merand reversibly reactive with the said transition metal halide to form an opaque homogeneous complex when the photothermotropic composition is in a high energy state, wherein said merand is a water-soluble vinyl polymer.

3. A photothermotropic composition according to claim 2, wherein said water-soluble vinyl polymer is a methyl-vinyl ethermaleic anhydride copolymer.

4. A photothermotropic composition according to claim 2, wherein said water-soluble vinyl polymer is a polyvinyl alcohol-acetate copolymer.

5. A photothermotropic composition consisting of in a solid solution a transition metal halide, a ligand reversibly reactive with said transition metal halide to form a transparent homogeneous complex when the photothermotropic composition is in a low energy state, and a merand reversibly reactive with the said transition metal halide to form an opaque homogeneous complex when the photothermotropic composition is in a high energy state, wherein said merand is a water-insoluble vinyl polymer.

6. A photothermotropic composition according to claim 1, wherein said ligand is water.

7. A photothermotropic composition according to claim 1, wherein said transition metal halide is a halide of copper.

8. A photothermotropic composition according to claim 7, wherein said halide of copper is cupric bromide.

9. A photothermotropic composition according to claim 7, wherein said halide of copper is cupric chloride.

10. A photothermotropic composition consisting in a solid solution a light sensitive metal halide, a ligand reversibly reactive with said light sensitive metal halide to form a transparent homogeneous complex when the photothermotropic composition is in a low energy state, and a merand reversibly reactive with the said transition metal halide to form an opaque homogeneous complex when the photothermotropic composition is in a high energy state.

11. The method of altering the transmission characteristics of a photo-thermotropic material which consists in applying energy to a composition consisting in solid solution of a transition metal halide, a ligand reversibly reactive with said transition metal halide in a low energy state and a merand reversibly reactive with said transition metal halide in the high energy state whereby the solid solution will change from a low absorption homogeneous complex in the low energy state to a high absorption homogeneous complex in the high energy state.

12. A composition according to claim 1 in which the merand is phosphoric acid and the metal is copper.

13. A composition according to claim 12 in which the phosphoric acid is present in an amount of the order of 31.5% and the metal in an amount of the order of 25.6%.

14. The method according to claim 11 in which the energy is electro-magnetic energy.

15. The method according to claim 11 in which the energy is light.

16. The method according to claim 11 in which the energy is thermal energy.

17. The method according to claim 11 in which the energy is electrical energy.

References Cited by the Examiner

UNITED STATES PATENTS

| | | | |
|---|---|---|---|
| 1,897,843 | 2/1933 | Hickman et al. | 96—88 |
| 1,962,307 | 6/1934 | Hickman et al. | 96—88 |
| 2,019,737 | 11/1935 | Sheppard et al. | 96—88 |
| 2,095,839 | 10/1937 | Sheppard et al. | 96—88 |
| 2,710,274 | 6/1955 | Kuehl | 96—89 |

FOREIGN PATENTS

| | | |
|---|---|---|
| 14,744 | 3/1956 | Germany. |

NORMAN G. TORCHIN, *Primary Examiner.*